(12) United States Patent
Mizutani et al.

(10) Patent No.: US 7,650,283 B2
(45) Date of Patent: Jan. 19, 2010

(54) DIALOGUE SUPPORTING APPARATUS

(75) Inventors: Kenji Mizutani, Nara (JP); Yoshiyuki Okimoto, Soraku-gun (JP); Taro Nambu, Moriguchi (JP)

(73) Assignee: Panasonic Corporation, Osaka (JP)

( * ) Notice: Subject to any disclaimer, the term of this patent is extended or adjusted under 35 U.S.C. 154(b) by 949 days.

(21) Appl. No.: 11/166,239

(22) Filed: Jun. 27, 2005

(65) Prior Publication Data

US 2005/0283365 A1    Dec. 22, 2005

Related U.S. Application Data

(63) Continuation of application No. PCT/JP2005/006596, filed on Apr. 4, 2005.

(30) Foreign Application Priority Data

Apr. 12, 2004    (JP)    .............................. 2004-117184

(51) Int. Cl.
*G10L 15/18*    (2006.01)

(52) U.S. Cl. ........................... 704/257; 704/9; 704/251; 704/270.1; 704/277; 704/2

(58) Field of Classification Search ................. 704/257, 704/9, 251, 270.1, 277, 231, 258, 260, 3, 704/2
See application file for complete search history.

(56) References Cited

U.S. PATENT DOCUMENTS

| | | | | |
|---|---|---|---|---|
| 5,005,127 A | * | 4/1991 | Kugimiya et al. ............... | 704/5 |
| 5,615,301 A | * | 3/1997 | Rivers ......................... | 704/277 |
| 5,634,086 A | * | 5/1997 | Rtischev et al. ............. | 704/270 |
| 5,797,123 A | * | 8/1998 | Chou et al. ............... | 704/256.5 |
| 6,154,720 A | * | 11/2000 | Onishi et al. .................... | 704/2 |
| 6,282,507 B1 | * | 8/2001 | Horiguchi et al. .............. | 704/3 |
| 6,829,603 B1 | * | 12/2004 | Chai et al. ..................... | 707/5 |
| 6,917,920 B1 | * | 7/2005 | Koizumi et al. ............. | 704/277 |
| 7,050,979 B2 | * | 5/2006 | Mizutani et al. ............. | 704/277 |
| 7,225,128 B2 | * | 5/2007 | Kim et al. .................... | 704/257 |
| 2002/0120436 A1 | * | 8/2002 | Mizutani et al. ............... | 704/2 |
| 2003/0220799 A1 | * | 11/2003 | Kim et al. ................... | 704/277 |
| 2008/0228484 A1 | * | 9/2008 | Gao et al. .................... | 704/251 |

FOREIGN PATENT DOCUMENTS

| | | |
|---|---|---|
| JP | 11-219368 | 8/1999 |
| JP | 2002-082983 | 3/2002 |
| JP | 2003-288339 | 10/2003 |

* cited by examiner

*Primary Examiner*—Vijay B Chawan
(74) *Attorney, Agent, or Firm*—Wenderoth, Lind & Ponack, L.L.P.

(57) ABSTRACT

A dialogue supporting apparatus that easily selects a desired sample sentence from among candidate-sample sentences corresponding to inputted speech. The dialogue supporting apparatus includes a speech recognition unit performing continuous speech recognition of the inputted speech, a database unit having a sample sentence database holding the correspondence of sample sentences of a source language and a target language, a sample sentence selection unit selecting one or more sample sentences from within the sample sentence database, according to a speech recognition result or operation of a GUI unit, a sample sentence comparison unit (i) comparing the one or more sample sentences selected by the sample sentence selection unit and the speech recognition result, (ii) calculating word scores from an appearance location of the words, and (iii) deriving a display parameter for each word of each sample sentence, based on the word scores, and the GUI unit performing the display of a sample sentence based on the display parameter.

16 Claims, 32 Drawing Sheets

FIG. 2

201
Sample sentence number: AAA0001
Source language: ①
Source language component: ① やあ (yaa) (Hello)
Component dependence relationships:
Target language: Hello.

202
Sample sentence number: AB00001
Source language: ①
Source language component: ① はい (hai) (Yes)
Component dependence relationships:
Target language: Yes.

203
Sample sentence number: AH00001
Source language:
　①/②/ます(masu)/か(ka) (Does it ② ① ?)
Source language component:
　① <日数(nissuu)>(number of days) ② かかり(kakari)(take)
Component dependence relationships: (① → ②)
Target language: Does it take ①?

204
Sample sentence number: K000002
Source language: ①/②/は(wa)/③/ます(masu)/か(ka)
　(Do you ③ ① ② ?)
Source language component: ① 何か(nanika)(any)
　② <薬(kusuri)>(medicine) ③ あり(ari)(have)
Component dependence relationships: (① → ②) (② → ③)
Target language: Do you have Any ② ?

FIG. 3

*Table 302:*

| Word ID | Inscription | Phonetic reading | Class information |
|---|---|---|---|
| w1 | 胃腸薬 (digestive medicine) | イチョウヤク (ICHOUYAKU) | c1 |
| w2 | 犬 (dog) | イヌ (INU) | c3 |
| w3 | やあ (hello) | ヤア (YAA) | |
| w4 | はい (yes) | ハイ (HAI) | |
| w5 | かかり (take) | カカリ (KAKARI) | |
| w6 | ます (*affirmative present tense) | マス (MASU) | |
| w7 | か (?) | カ (KA) | |
| w8 | は (*particle/subject modifier) | ワ (WA) | |

*Table 301:*

| Class ID | Class name | Source language | Target language |
|---|---|---|---|
| c1 | <薬> (kusuri) (medicine) | 薬 (kusuri) | medicine |
| | | アスピリン (asupirin) | aspirin |
| | | トローチ (torôchi) | troche |
| | | 風邪薬 (kazegusuri) | cold medicine |
| | | 胃腸薬 (ichouyaku) | digestive medicine |
| c2 | <果物> (kudamono) (fruits) | 果物 (kudamono) | fruits |
| | | りんご (ringo) | apple |
| | | みかん (mikan) | orange |
| | | いちご (ichigo) | strawberry |
| c3 | <ペット> (petto) (pet) | ペット (petto) | pet |
| | | 犬 (inu) | dog |
| | | 猫 (neko) | cat |
| | | ウサギ (usagi) | rabbit |
| c4 | <日数> (nissuu) (number of days) | 1日 (ichinichi) | one day |
| | | 2日 (futsuka) | two days |
| | | 3日 (mikka) | three days |
| | | ...... | ...... |
| | | 7日 (nanoka) | seven days |

FIG. 17

1701
Sample sentence number: E000001
Source language:
①/が(ga)/②/の(no)/です(desu)/が(ga)(I ②①)
Source language component:
①<薬(kusuri)>(medicine)②ほしい (hoshii) (want)
Component dependence relationships: (①→②)
Target language: I want ①.

1702
Sample sentence number: E000002
Source language: ①/は(wa)/どこ(doko)/で(de)/②
/って(tte)/い(i)/ます(masu)/か(ka) (Where do they②①?)
Source language component:
①<薬(kusuri)>(medicine) ②売 (u) (sell)
Component dependence relationships: (①→②)
Target language: Where do they sell ①?

1703
Sample sentence number: E000003
Source language: ①/で(de)/②/は(wa)/③/え(e)
/ます(masu)/か (ka) (Can I ③② in the ① ?)
Source language component:
①医務室 (imushitsu) (medical room)
② <薬(kusuri)>(medicine) ③もら (mora) (have)
Component dependence relationships: (①→③)(②→③)
Target language: Can I have ② in the medical room?

1704
Sample sentence number: E000004
Source language:
①/②/は(wa)/③/ます(masu)/か(ka) (Do you ③①②?)
Source language component: ①何か(nanika)(any)
②<薬(kusuri)>(medicine) ③あり(ari)(have)
Component dependence relationships:
(①→②)(②→③)
Target language: Do you have any ②?

FIG. 20A

| Speech recognition result | 売 (buy) | ほしい (want) | 胃腸薬 (digestive medicine) | もら (have) | あり (is) | |
|---|---|---|---|---|---|---|
| Phonetic inscription of recognition result | ウ U | ホシイ HO·SHI·I | イチョウヤク I·CHO·U·YA·KU | モラ MO·RA | アリ A·RI | Phonetic inscription length: 13 |
| Word appearance location | 0 | 1 | 4 | 9 | 11 | |
| Location after normalization | 0 | 0.08 | 0.31 | 0.69 | 0.85 | |

FIG. 20B

| Sample sentence | Number of dependency relationships established | Appearance location in the phonetic reading (location after normalization shown below) | Length of phonetic inscription |
|---|---|---|---|
| 胃腸薬がほしいのですが (I want digestive medicine) | 1 | イチョウヤクガホシイノデスガ (I·CHO·U·YA·KU·GA·HO·SHI·I·NO·DE·SU·GA) <br> 6 <br> 0.46 | 13 |
| 胃腸薬はどこで売っていますか (Where do they sell digestive medicine?) | 1 | イチョウヤクワドコデウッテイマスカ (I·CHO·U·YA·KU·WA·DO·KO·DE·U·TTE·I·MA·SU·KA) <br> 9 <br> 0.6 | 15 |
| 医務室で胃腸薬はもらえますか (Can I have digestive medicine in the medical room?) | 1 | イムシツデイチョウヤクワモラエマスカ (I·MU·SHI·TSU·DE·I·CHO·U·YA·KU·WA·MO·RA·E·MA·SU·KA) <br> 11 <br> 0.65 | 17 |
| 何か胃腸薬はありますか Do you have any digestive medicine? | 1 | ナニカイチョウヤクワアリマスカ (NA·NI·KA·I·CHO·U·YA·KU·WA·A·RI·MA·SU·KA) <br> 9 <br> 0.64 | 14 |

| Sample sentence | Number of dependency relationships established | Appearance location in the phonetic reading (word score shown below) | Length of phonetic inscription |
|---|---|---|---|
| 胃腸薬がほしいのですか (I want digestive medicine) | 1 | イチョウヤクガホシイデスカ<br>(I・CHO・U・YA・KU・GA・HO・SHI・I・NO・DE・SU・GA)<br>0          6<br>-0.31    0.38 | 13 |
| 胃腸薬はどこで売っていますか (Where do they sell digestive medicine?) | 1 | イチョウヤクワドコデウッテイマスカ<br>(I・CHO・U・YA・KU・WA・DO・KO・DE・U・TTE・I・MA・SU・KA)<br>0          9<br>-0.31    0.6 | 15 |
| 医務室で胃腸薬はもらえますか (Can I have digestive medicine in the medical room?) | 1 | イムシツデイチョウヤクワモラエマスカ<br>(I・MU・SHI・TSU・DE・I・CHO・U・YA・KU・WA・MO・RA・E・MA・SU・KA)<br>5          11<br>-0.02     -0.04 | 17 |
| 何か胃腸薬はありますか Do you have any digestive medicine? | 1 | ナニカイチョウヤクアリマスカ<br>(NA・NI・KA・I・CHO・U・YA・KU・WA・A・RI・MA・SU・KA)<br>3          9<br>-0.1       -0.21 | 14 |

Candidate-sample sentence selection

胃腸薬がほしいのですが
(ichouyakugahoshiinodesuga)
(I want digestive medicine)
胃腸薬はどこで売っていますか
(ichouyakuwadokodeutteimasuka)
(Where do they sell digestive medicine?)
医務室で胃腸薬はもらえますか
(imushitudeichouyakuwamoraemasuka)
(Can I have digestive medicine in the medical room?)
何か胃腸薬はありますか
(nanikaichouyakuwaarimasuka)
(Do you have any digestive medicine?)

— 405

Result-sample sentence

Translation result

Speech input

FIG. 24

| Sample sentence | Number of dependency relationships established | Appearance location in the phonetic reading (score shown below) 2401 | Sentence score |
|---|---|---|---|
| 胃腸薬がほしいのですが (I want digestive medicine) | 1 | イ チョウ ヤク ガ ホ シ イ デ ス ガ (I·CHO·U·YA·KU·GA·HO·SHI·I·NO·DE·SU·GA) 0    6 -0.31    0.38 | 0 |
| 胃腸薬はどこで売っていますか (Where do they sell digestive medicine?) | 1 | イ チョウ ヤク ワ ド コ デ ウ ッテ イ マ ス カ (I·CHO·U·YA·KU·WA·DO·KO·DE·U·TTE·I·MA·SU·KA) 0    9 -0.31    0.6 | 0 |
| 医務室で胃腸薬はもらえますか (Can I have digestive medicine in the medical room?) | 1 | イ ム シツ デ イ チョウ ヤク ワ ク モ ラ エ マ ス カ (I·MU·SHI·TSU·DE·I·CHO·U·YA·KU·WA·MO·RA·E·MA·SU·KA) 3    5    11 -0.1    -0.02    -0.04 | 2 |
| 何か胃腸薬はあり ますか Do you have any digestive medicine? | 1 | ナ ニ カ イ チョウ ヤク ワ アリ マ ス カ (NA·NI·KA·I·CHO·U·YA·KU·WA·A·RI·MA·SU·KA) 9 -0.21 | 1 |

FIG. 25

Candidate-sample sentence selection

医務室で胃腸薬はもらえますか
(imushitsudeichouyakuwamoraemasuka) (Can I have digestive medicine in the medical room?)
何か胃腸薬はありますか
(nanikaichouyakuwaarimasuka)
(Do you have any digestive medicine?)
胃腸薬がほしいのですが
(ichouyakugahoshiinodesuga) (I want digestive medicine)
胃腸薬はどこで売っていますか
(ichouyakuwadokodeutteimasuka) (Where do they sell digestive medicine?)

405

Result-sample sentence

Translation result

Speech input

FIG. 26

```
Sample sentence number: E000010
Source language: I ① ②
Source language component: ① want ② <medicine>
Component dependence relationships: (② → ①)
Target language: 私は ② が欲しい。
    (watashiwa ② gahoshii) (I want ②.)
```
2601

```
Sample sentence number: E000011
Source language: Where do they ① ②?
Source language component: ① sell ② <medicine>
Component dependence relationships: (② → ①)
Target language: ② はどこで売っていますか。
    (② wadokodeutteimasuka) (Where do they sell ②?)
```
2602

```
Sample sentence number: E000012
Source language: Can I ① ② in ③?
Source language component:
    ① have ② <medicine> ③ medical room
Component dependence relationships: (② → ①) (③ → ①)
Target language: ②は医務室でもらえますか。
    (② waimushitsudemoraemasuka) (Can I have ② in the
    medical room?)
```
2603

```
Sample sentence number: E000013
Source language: Could you please tell me if you ① ②
Source language component: ① have ② <medicine>
Component dependence relationships: (② → ①)
Target language: ②をお持ちですか?
    (② woomochidesuka) (Do you have ②?)
```
2604

FIG. 28A

```
Speech recognition result  : want      I    have    medicine   in    sell   room
Recognition result in      : wɑ́nt      ái   hǽv     médsn      ín    sél    rúːm
pronunciation symbols
Word appearance location   :  0        2.5   4.5     6.5        9.5   11     13    Pronunciation
                                                                                    symbol length: 16
Location after             :  0        0.16  0.28    0.46       0.59  0.69   0.81
normalization
```

FIG. 28B

| Sample sentence | Number of dependency relationships established | Appearance location in the phonetic reading (location after normalization shown below) | Length of pronunciation symbols |
|---|---|---|---|
| I want medicine. | 1 | ái wɑ́nt médsn<br>2    4.5<br>0.27  0.60 | 7.5 |
| Where do they sell medicine? | 1 | wé dúː ðé sél médsn<br>              6.5  8.5<br>              0.57 0.74 | 11.5 |
| Can I have medicine in medical room? | 1 | kǽn ái hǽv médsn ín médkl rúːm<br>         4   6<br>        0.24 0.36 | 16.5 |
| Could you please tell me if you have medicine? | 1 | kúd júː pliːz tél miː if júː hǽv médsn<br>                              16.5 18.5<br>                              0.77 0.86 | 21.5 |

FIG. 29

| Sample sentence | Number of dependency relationships established | Appearance location in the phonetic reading (word score shown below) | Length of pronunciation symbols |
|---|---|---|---|
| I want medicine. | 1 | ái wánt médsn<br>2    4.5<br>0.27  0.14 | 7.5 — 2901 |
| Where do they sell medicine? | 1 | wé dú: ðé sél médsn<br>6.5  8.5<br>−0.12  0.28 | 11.5 |
| Can I have medicine in medical room? | 1 | kǽn ái hǽv médsn ín médkl rú:m<br>4    6<br>−0.04  −0.10 | 16.5 |
| Could you please tell me if you have medicine? | 1 | kúd jú: plí:z tél mi: if jú: hǽv médsn<br>16.5  18.5<br>0.49  0.40 | 21.5 |

FIG. 31

| Sample sentence | Number of dependency relationships established | Appearance location in the phonetic reading (word score shown below) | Sentence score |
|---|---|---|---|
| I want medicine. | 1 | ái wánt médsn<br>2   4.5<br>0.27   0.14 | 0 |
| Where do they sell medicine? | 1 | wé dú: ðé sél médsn<br>6.5   8.5<br>-0.12   0.28 | 0 |
| Can I have medicine in medical room? | 1 | kǽn ái hǽv médsn ín médkl rú:m<br>4   6<br>-0.04   -0.10 | 2 |
| Could you please tell me if you have medicine? | 1 | kúd jú: pli:z tél mi: if jú: hǽv médsn<br>16.5   18.5<br>0.49   0.40 | 0 |

3101

DIALOGUE SUPPORTING APPARATUS

CROSS REFERENCE TO RELATED APPLICATION

This is a continuation of PCT application No. PCT/JP2005/006596, filed on Apr. 4, 2005.

BACKGROUND OF THE INVENTION (1) Field of the Invention

The present invention relates to a portable dialogue supporting apparatus which converts a speech-inputted source language sentence into a target language and outputs the converted sentence in speech or text form.

(2) Description of the Related Art

Dialogue supporting systems which translate speech input have been developed as software for workstations and personal computers. In a laboratory environment, performance has reached a practical level for users familiar with their usage, in the case where the scope of conversation is limited to applications for travel conversation, and the like. However, in terms of usability, performance has not yet reached a level that allows usage by the average overseas tourist on an actual trip. In order to improve usability, packaging in readily-portable size hardware and implementation in a user interface that is easy to master and operate, is necessary.

Conventionally, usability is improved by limiting the functions and performance of speech translation software developed for workstations and personal computers, and transplanting these into a Personal Digital Assistant (PDA) (see "AN EXPERIMENTAL MULTILINGUAL SPEECH TRANSLATION SYSTEM", Kenji Matsui et al., Workshops on Perceptual/Perceptive User Interfaces 2001, ACM Digital Library, ISBN 1-58113-448-7, for example).

In the sample sentence-based translation method using speech input, many thousands of sample sentences need to be prepared in order to cover the average travel conversation, and depending on the result of speech recognition, there are cases where many sample sentences appear as candidates. For example, in the case where words having a high frequency of appearance, in terms of the sample sentences as a whole (for example, 「ある(aru)」(be, have), 「円(en)」(Yen), and so on), are accurately recognized in the speech recognition but the rest of the sample sentences cannot be recognized satisfactorily, the number of sample sentences selected as candidates and presented to the user consequently increases. In such cases, it is not easy for the user to select a desired sample sentence from among the candidate-sample sentences. In particular, when the display device for viewing the list of candidate-sample sentences is small and the number of sample sentences that can be viewed simultaneously is considerably small, selecting a desired sample sentence from among the candidates presented becomes even more difficult. Furthermore, when a sample sentence that is similar to the desired sample sentence is found while looking through the candidate-sample sentences, there are many instances where there is hesitation in deciding as to whether to select such sample sentence or to search for a closer matching sample sentence. As such, a function for aiding selection for large amounts of candidate-sample sentences is necessary.

For this reason, the applicant of the present application proposes a speech conversion apparatus that enables a flexible search by searching out a sample sentence based on the dependence relationship of words within the sample sentence, and can improve the usability of displayed details (see Japanese Laid-Open Patent Application No. 2003-288339 Publication, for example).

However, the improvement of sample sentence search accuracy has limitations. In particular, in the case where the display device for viewing the list of candidate-sample sentences is small and the number of sample sentences that can be viewed simultaneously is considerably small, selecting a desired sample sentence from among the insufficiently presented candidates is difficult.

Thus, the present invention is conceived in view of the above-mentioned circumstances, and has as an objective to provide a dialogue supporting apparatus that can easily select a desired sample sentence from among candidate-sample sentences corresponding to inputted speech.

SUMMARY OF THE INVENTION

In order to achieve the aforementioned objective, the dialogue supporting apparatus in the present invention is a dialogue supporting apparatus which recognizes speech inputted in a source language, and presents a corresponding translation in a target language, depending on a result of the speech recognition. The dialogue supporting apparatus includes a sample sentence search unit operable to search out a sample sentence in the source language based on a keyword included in the speech recognition result, a sample sentence comparison unit operable to derive a keyword correspondence degree of the keyword by comparing a location within the sample sentence, of the keyword included in the speech recognition result and a location of the keyword within the speech recognition result, and a sample sentence display control unit operable to display the searched-out sample sentence, and to highlight the keyword within the sample sentence based on the keyword correspondence degree.

As is clear from the previous explanation, according to the dialogue supporting apparatus in the present invention, it is possible to highlight-display a keyword included in sample sentences expected to be desired by the user, within a large number of candidate-sample sentences. As such, even in the case where the result of speech recognition is insufficient and a large number of candidates are obtained, it is possible for the user to easily and promptly select a desired sample sentence from the highlight-displayed or sorted candidate-sample sentences. Accordingly, the user is able to search for the desired sample sentence smoothly through speech input, and as the other party in the dialogue is not made to wait, it is possible to carry out a dialogue smoothly via the dialogue supporting apparatus. As the occasions in which use of languages other than the source language increases, the practical value of the dialogue supporting apparatus, which is presently gaining popularity, is very high.

FURTHER INFORMATION ABOUT TECHNICAL BACKGROUND TO THIS APPLICATION

The disclosure of Japanese Patent Application No. 2004-117184 filed on Apr. 12, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. The Drawings are described below.

FIG. 2 is a diagram showing an example of the structure of the sample sentence database in an embodiment of the dialogue supporting apparatus in the present invention.

FIG. 3 is diagram showing and example of the structure of the class-word information in an embodiment of the dialogue supporting apparatus in the present invention.

FIG. 17 is a diagram showing an example of the structure of the sample sentence database in an embodiment of the dialogue supporting apparatus in the present invention.

FIGS. 20A and 20B are diagrams showing examples of the word appearance location calculation by the sample sentence comparison unit in an embodiment of the dialogue supporting apparatus in the present invention. FIG. 20A shows the result of the word appearance location calculation with respect to the speech recognition result. FIG. 20B shows the result of the word appearance location calculation with respect to the sample sentence.

FIG. 21 is a diagram showing an example of word score calculation by the sample sentence comparison unit in an embodiment of the dialogue supporting apparatus in the present invention.

FIG. 22 is a diagram showing an example of details displayed by the GUI unit in an embodiment of the dialogue supporting apparatus in the present invention.

FIG. 24 is a diagram showing an example of word score calculation by the sample sentence comparison unit in an embodiment of the dialogue supporting apparatus in the present invention.

FIG. 25 is a diagram showing an example of details displayed by the GUI unit in an embodiment of the dialogue supporting apparatus in the present invention.

FIG. 26 is a diagram showing an example of the structure of the sample sentence database in an embodiment of the dialogue supporting apparatus in the present invention.

FIGS. 28A and 28B are diagrams showing examples of the word appearance location calculation by the sample sentence comparison unit in an embodiment of the dialogue supporting apparatus in the present invention. FIG. 28A shows the result of the word appearance location calculation with respect to the speech recognition result. FIG. 28B shows the result of the word appearance location calculation with respect to the sample sentence.

FIG. 29 is a diagram showing an example of word score calculation by the sample sentence comparison unit in an embodiment of the dialogue supporting apparatus in the present invention.

FIG. 31 is a diagram showing an example of sentence score calculation by the sample sentence comparison unit in an embodiment of the dialogue supporting apparatus in the present invention.

DETAILED DESCRIPTION OF THE INVENTION

Figure 1:
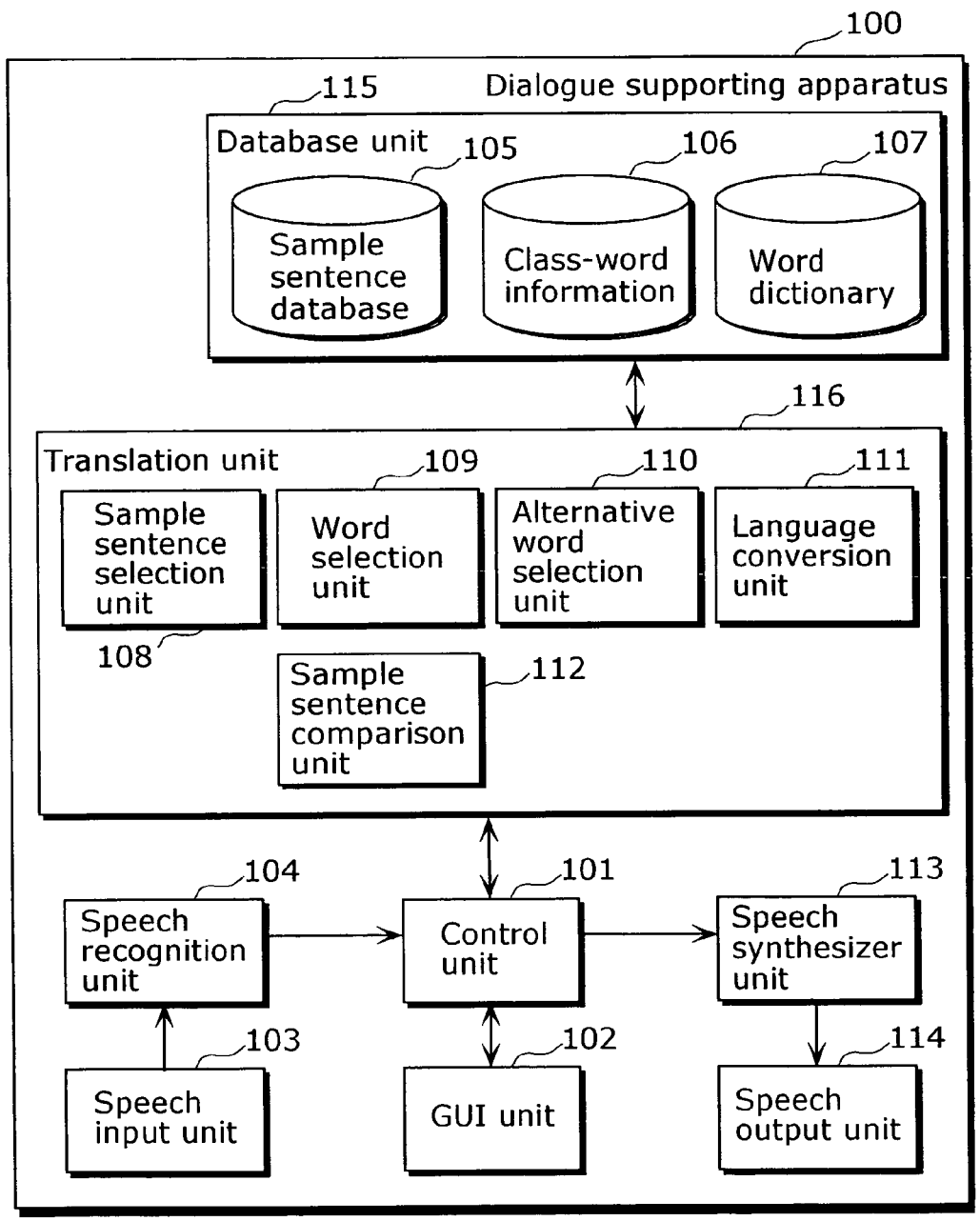
FIG. 1 is a block diagram showing an embodiment of the dialogue supporting apparatus in the present invention.

The dialogue supporting apparatus in the embodiments of the present invention is a dialogue supporting apparatus which recognizes speech inputted in a source language, and presents a corresponding translation in a target language, depending on a result of the speech recognition. The dialogue supporting apparatus includes a sample sentence search unit operable to search out a sample sentence in the source language based on a keyword included in the speech recognition result, a sample sentence comparison unit operable to compare the speech recognition result and the searched-out sample sentence, and a sample sentence display control unit operable to display the searched-out sample sentence, and to highlight the keyword within the sample sentence based on the comparison of the speech recognition result and the sample sentence.

Accordingly, it is possible to highlight-display a keyword that is included in the sample sentence that is probably desired by the user, among many candidate sample sentences. As such, the user can easily and promptly select a desired sample sentence from the among many candidate sample sentences corresponding to the inputted speech.

Here, it is preferable that the sample sentence comparison unit is operable to derive a keyword correspondence degree of the keyword by comparing a location within the sample sentence, of the keyword included in the speech recognition result and a location of the keyword within the speech recognition result, and the sample sentence display control unit is operable to highlight the keyword within the sample sentence based on the keyword correspondence degree.

Furthermore, it is preferable that the sample sentence comparison unit is operable to derive, based on the keyword correspondence degree, a display parameter for highlighting the keyword, and the sample sentence display control unit is operable to highlight the keyword within the sample sentence based on the display parameter.

Furthermore, it is preferable that the sample sentence comparison unit is operable to derive the location within the sample sentence, of the keyword included in the speech recognition result and the location of the keyword within the speech recognition result, using an appearance location in a character string of one of Japanese phonetic inscription and pronunciation symbols.

Accordingly, deriving the location of keywords can be performed in a short period of time compared to, for example, deriving the location of keywords using the elapsed times in pronunciations according to speech recognition.

Furthermore, it is preferable that the sample sentence comparison unit is operable to change the number of characters in one of the Japanese phonetic inscription and pronunciation symbols depending on a character type, and to count the changed number of characters, in deriving the location within the sample sentence, of the keyword included in the speech recognition result and the location of the keyword within the speech recognition result, using the appearance location in a character string of one of Japanese phonetic inscriptions and pronunciation symbols.

Furthermore, it is preferable that the sample sentence comparison unit is operable to change the number of characters depending on whether the character type is any of a short sound, a prolonged sound, and a choked sound, of the Japanese phonetic inscriptions, and to count the changed number of characters, in the case where the source language is Japanese.

Furthermore, it is preferable that the sample sentence comparison unit is operable to change the number of characters lo depending on whether the character type is any of a vowel, a long vowel, and a consonant, of the pronunciation symbols, and to count the changed number of characters, in the case where the source language is English.

Furthermore, it is preferable that the sample sentence comparison unit is operable to adopt as the keyword correspondence degree, the difference between the location within the sample sentence, of the keyword included in the speech recognition result and the location of the keyword within the speech recognition result.

Furthermore, it is preferable that the sample sentence comparison unit is operable to adopt as the keyword correspondence degree, a normalized value of the difference between the location within the sample sentence, of the keyword included in the speech recognition result and the location of the keyword within the speech recognition result.

Furthermore, it is preferable that the sample sentence comparison unit is operable to derive a sentence correspondence degree for the sample sentence based on a keyword correspondence degree of each keyword included in the sample sentence.

Here, it is preferable that the sample sentence comparison unit is operable to derive as the sentence correspondence degree, the number of the keywords in the sample sentence, having a keyword correspondence degree that is not lower than a predetermined value.

Furthermore, it is preferable that the sample sentence display control unit is operable to determine, when displaying a plurality of sample sentences, a display order of the sample sentences based on the sentence correspondence degree.

Accordingly, it is possible to preferentially display the sample sentence that is probably desired by the user, from among the many candidate sample sentences. As such, the user can easily and promptly select a desired sample sentence from among the many candidate sample sentences.

Furthermore, the sample sentence searching apparatus in the present invention is a sample sentence searching apparatus which searches out a sample sentence corresponding to an inputted sentence. The sample sentence searching apparatus includes a sample sentence search unit operable to search out the sample sentence based on a keyword included in the sentence, a sample sentence comparison unit operable to compare the sentence and the searched-out sample sentence, and a sample sentence display control unit operable to display the searched-out sample sentence, and to highlight the keyword within the sample sentence based on the comparison of the sentence and the sample sentence.

Accordingly, it is possible to highlight-display a keyword that is included in the sample sentence that is probably desired by the user, among many candidate sample sentences. As such, the user can easily and promptly select a desired sample sentence from the among many candidate sample sentences.

Moreover, the present invention can be realized, not only as such a dialogue supporting apparatus, but also as a dialogue support method having the characteristic units included in such dialogue supporting apparatus as steps, and as a program which causes a computer to execute such steps. In addition, it goes without saying that such a program can be distributed via a recording medium such as a CD-ROM, a transmission medium such as the Internet, and so on.

Hereinafter, the embodiments of the present invention shall be explained with reference to the diagrams.

FIG. 1 is a block diagram showing the structure of an embodiment of the dialogue supporting apparatus in the present invention.

A dialogue supporting apparatus 100 is a dialogue supporting apparatus which performs speech recognition on, and presents translation language (target language) corresponding to, a source language, according to the result of the speech recognition. As shown in FIG. 1, the dialogue supporting apparatus 100 includes a control unit 101, a Graphical User Interface (GUI) unit 102, a speech input unit 103, a speech recognition unit 104, a database unit 115, a translation unit 116, a speech synthesizer unit 113, and a speech output unit 114. Furthermore, the database unit 115 includes a sample sentence database 105, class-word information 106, and a word dictionary 107. Furthermore, the translation unit 116 includes a sample sentence selection unit 108, a sample sentence comparison unit 112, a word selection unit 109, an alternative word selection unit 110, and a language conversion unit 111.

The control unit 101 instructs each component, and controls the flow of information among the respective components. The GUI unit 102 receives and sends, to the control unit 101, the input from a user, and displays information on sample sentences, and so on, from the control unit 101, based on a display parameter. The speech input unit 103 collects the sound of the user's speech. The speech recognition unit 104 performs sequential speech recognition of the user's speech sent from the speech input unit 103. The sample sentence database 105 holds the correspondence of sample sentences in the source language and the target language. The class-word information 106 holds information regarding words in the sample sentence database 105 that have been classified. The word dictionary 107 holds information regarding all words (keywords) used in the sample sentence database 105 and the class-word information 106. The sample sentence selection unit 108 selects one or more sample sentences from within the sample sentence database 105 according to the speech recognition result sent by the control unit 101 or the operation of the GUI unit 102.

The sample sentence comparison unit 112 compares the one or more sample sentences selected by the sample sentence selection unit 108 and the result of the speech recognition by the speech recognition unit 104, and calculates the appearance location of words. Furthermore, the sample sentence comparison unit 112 calculates a word score (keyword correspondence degree) from the appearance locations, and derives a display parameter for each word in each sample sentence, based on such word score. The word selection unit 109, following instructions from the control unit 101, selects a classified word in one of the sample sentences within the sample sentences selected by the sample sentence selection unit 108. The alternative word selection unit 110 refers to the class-word information 106 and selects an alternative word for the classified word identified by the control unit 101. The language conversion unit 111 converts the sample sentence specified by the control unit 101 into the target language by referring to the sample sentence database 105 and the class-word information 106. The speech synthesizer unit 113 converts the sample sentence in the target language, identified by the control unit 101, into synthesized speech. The speech output unit 114 provides the output of the speech synthesizer unit 113 to the user in the form of speech.

FIG. 2 is a diagram showing a specific example for the sample sentence database 5. Here, to simplify explanation, four sample sentences are selected from among many sample sentences. Each of the sample sentences corresponds to one sentence in a dialogue, and is a sentence with a high frequency of usage in normal travel conversation. The field "Sample sentence number:" is an identifier for identifying one sample sentence within the sample sentence database, and there is no duplication with other sample sentences. The fields "Source language:" and "Target language:" for each sample sentence hold the correspondence between the source language and the target language. "Source language components:" and "Component dependence relationships:" are used when searching out sample sentences using speech.

In the "Source language:" field, slash marks "/" indicate the separation between words managed in the word dictionary 107. Furthermore, encircled numbers in the "Source language:" field are pointers indicating words recorded in the "Source language components:" field. For example, encircled number 2 in the "Source language:" field in sample sentence 203 indicates encircled number 2 「かか り( kakari )」 (take) in the "Source language components:" field. Accordingly, the "Source language:" field in sample sentence 203 is interpreted in the dialogue supporting apparatus 100 as, "<日数(nissuu)> (number of days) かかります(kakarimasu) (take) か(ka) (?) (Does it take <number of days>?)".

In the dialogue supporting apparatus 100, being classified means "being associated with words that are of the same type or same kind in terms of meaning". For example, encircled number 1 in the "Source language components:" of sample sentence 203 and encircled number 2 in the "Source language components:" of sample sentence 204 are each classified words. A classified word can be replaced with a word in the same class, defined in the class-word information 106. In the present embodiment, classified words are shown enclosed in inequality marks, for convenience.

FIG. 3 is a diagram showing a specific example 301 for the class-word information 106, and a specific example 302 for the word dictionary 107. Each class carries an identifier (class ID) which is unique in the dialogue supporting apparatus 100, and words having a high level of abstraction such as 「薬(kusuri)」 (medicine) and 「果物(kudamono)」 (fruit) are assigned as class names. In the specific example 301, the first lines in the pairs of words in the "Source language:" and the "Target language:" belonging to the same class IDs are class representative words. For example, in the class name <薬(kusuri)> (medicine), 「薬(kusuri)」 (medicine) and "medicine" are class representatives words for c1. The rest of the lines are member words representing specific entities in the class. For example, in c1 「アスピリン(asupirin)」 (aspirin) and "aspirin", 「トローチ(torôchi)」 (troche) and "troche", and so on, are member words of c1. Moreover, the class-word information 106 may be structured with hierarchized classes. The word dictionary 107 holds and manages all the words included the class-word information 106 and the words appearing in the "Source language components:" field of the sample sentence database 105. It is structured by an identifier (word ID) carried by each word, which is unique within the present apparatus, their inscription, Japanese phonetic inscription and pointer for the class-word information 106. For example, a word having the word ID "w2" in the specific example 302 has 「犬(inu)」 (dog) as it's inscription, a Japanese phonetic inscription of 「イヌ」(INU), and class information of "c3" which indicates a class name <ペット(petto)>(pet) in the specific example 301. Moreover, although the inscription and class name of the word is used for convenience in the "Source language:" field and "Source language components:" field in the specific example for the sample sentence database 105 shown in FIG. 2, they are actually structured by a word ID and a class ID.

Figure 4:
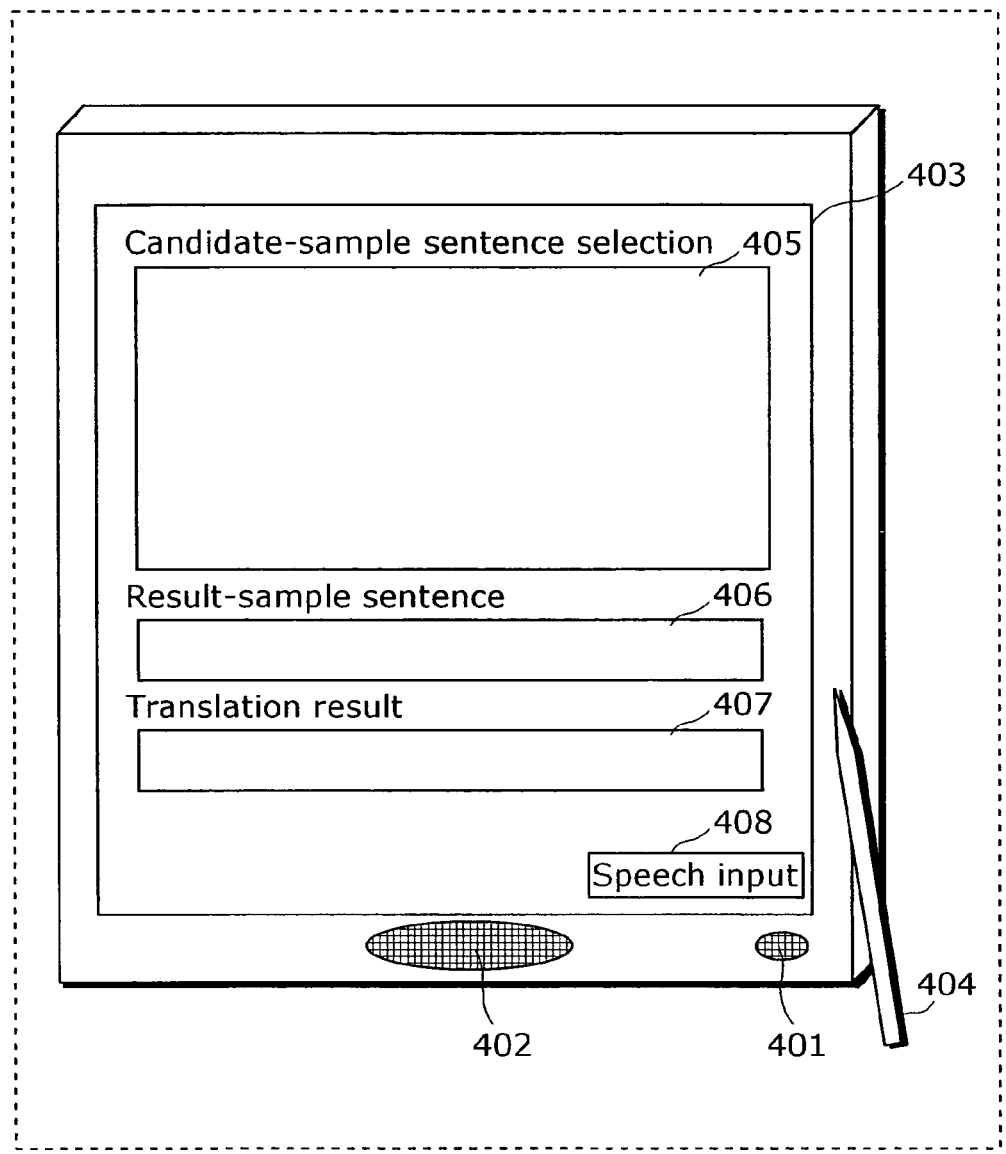
FIG. 4 is a diagram showing an example of a PDA in an embodiment of the dialogue supporting apparatus in the present invention.

FIG. 4 is a diagram showing the appearance of a commercially available, typical PDA or compact personal computer equipped with the present invention. A microphone 401 corresponds to the speech unit 103 and a speaker 402 corresponds to the speech output unit 114. The user utters speech into the microphone 401 and has the other party listen to the target language outputted from the speaker 402. A touch-panel-equipped liquid crystal display 403 corresponds to the GUI unit 102, and the user operates an object displayed on the liquid crystal display 403 using a stylus 404. Furthermore, a candidate-sample sentence selection area 405 is an area for displaying and selecting sample sentences, a sample sentence selection result display area 406 is an area which displays a sample sentence designated by a user, and a translation result display area 407 is an area which displays the sample sentence converted into the target language by the language conversion unit 111. A button 408 is an area pressed just before starting speech input. Moreover, although not shown in FIG. 4 as it can be easily inferred and implemented, in the case where the PDA, personal computer, and the like, is equipped with an input device such as buttons and a keyboard, the GUI unit 102 can be operated using such input device in place of the stylus 404.

Next, the operation of the dialogue supporting apparatus 100 structured in the above-mentioned manner shall, for the sake of simplicity, be initially explained without the operation of the sample sentence comparison unit 112.

Figure 5:
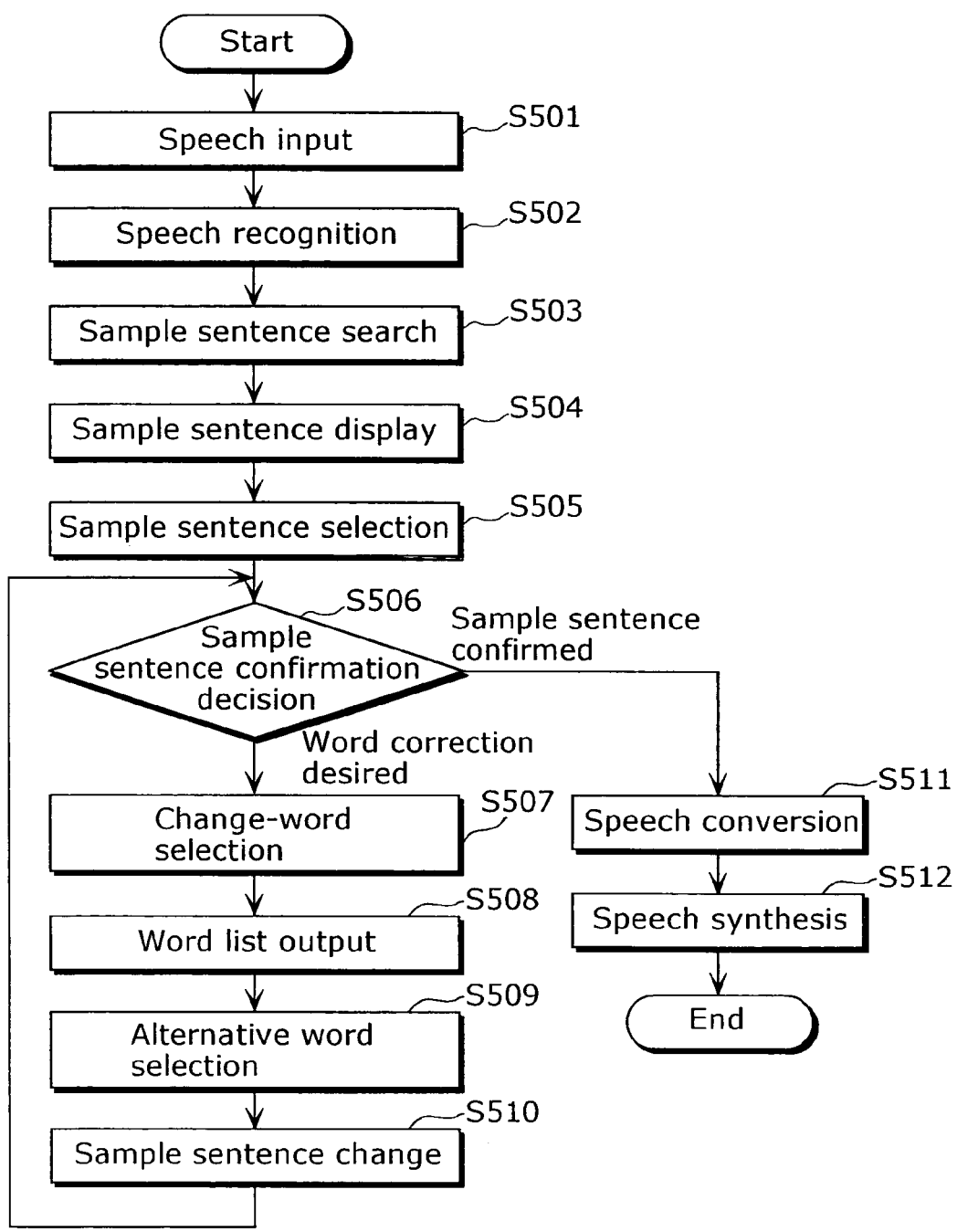
FIG. 5 is a flowchart showing the flow of operation, without the sample sentence comparison unit, of an embodiment of the dialogue supporting apparatus in the present invention.

FIG. 5 is a basic flowchart showing the flow of operation of the dialogue supporting apparatus 100, without the sample sentence comparison unit 112. FIG. 6 to FIG. 16, are diagrams respectively showing an example of details displayed by the GUI unit 102.

Figure 6:
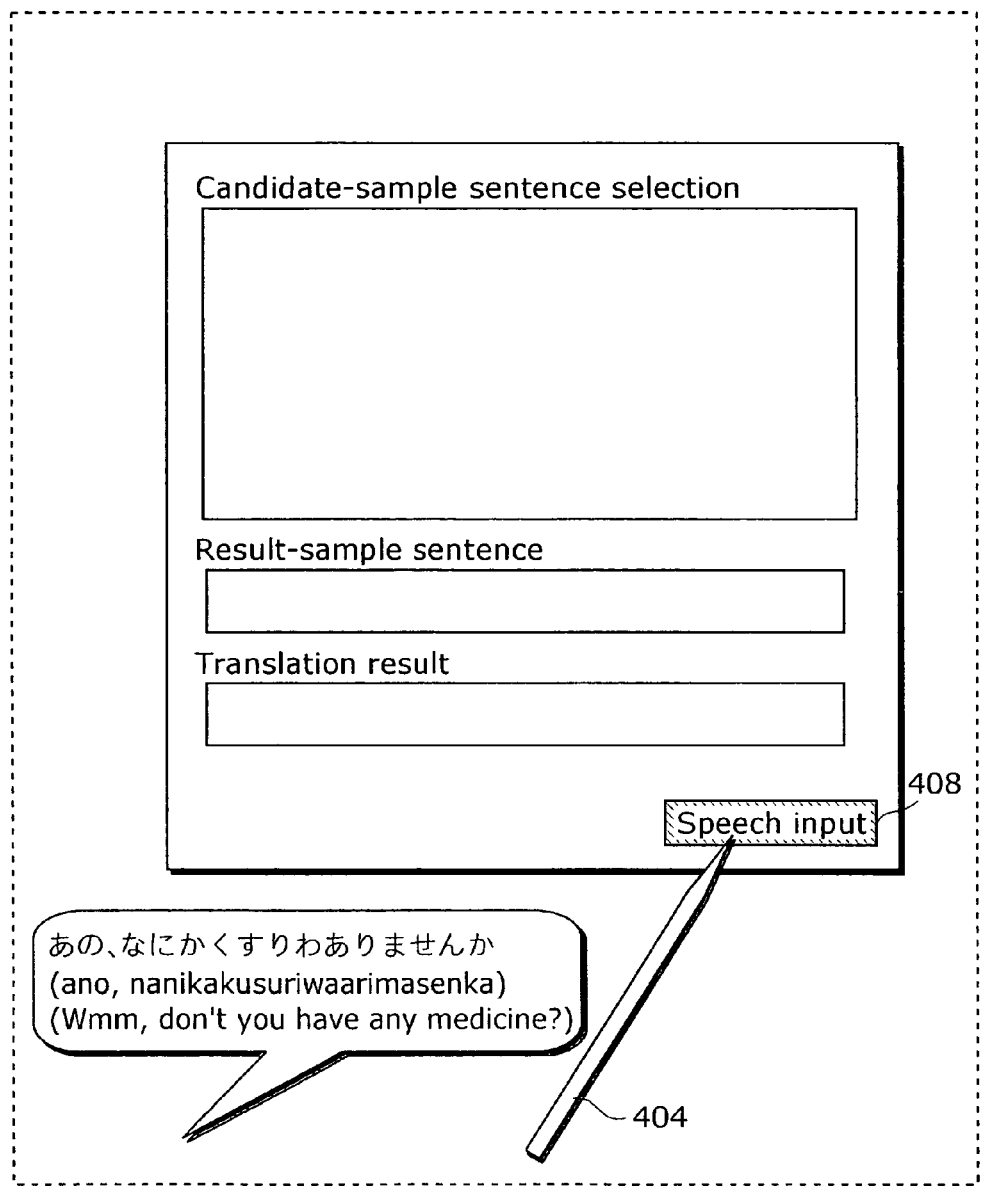
FIG. 6 is a diagram showing an example of PDA usage by a user in an embodiment of the dialogue supporting apparatus in the present invention.

First, when the button 408 is pressed by the user, as shown in FIG. 6, the control unit 101 instructs the speech input unit 103 to perform speech input. Using the microphone 401, the user utters, for example, 「あの、なにかくすりはありませんか(ano, nanikakusuriwaarimasenka)」 (Wmm, don't you have any medicine?). The speech input unit 103 transmits the inputted speech to the speech recognition unit 104 (step S501). The speech recognition unit 104 performs speech recognition and outputs the recognition result to the control unit 101 (step S502).

From here on, explanation shall be made for the case where a misrecognition-inclusive recognition result, 「7日薬はありますか(nanokakusuriwaarimasuka)」 (Do you have seven days medicine?) is outputted by the speech recognition unit 104 for the input 「あの、なにかくすりはありませんか(ano, nanikakusuriwaarimasenka)」 (Wmm, don't you have any medicine?).

The control unit 101 commands the sample sentence selection unit 108 to search out sample sentences basing from 「7日薬はありますか(nanokakusuriwaarimasuka)」 (Do you have seven days medicine?). The sample sentence selection unit 108 searches out sample sentences basing from 「7 日 薬 は あ り ま す か(nanokakusuriwaarimasuka)」 (Do you have seven days medicine?) (step S503). In other words, the sample sentence selection unit 108 extracts, basing from the speech recognition result 「7日薬はありますか(nanokakusuriwaarimasuka)」 (Do you have seven days medicine?), words appearing in the "Source language components:" field of the sample sentences defined in the sample sentence database 105, in other words, the collection of important words 「7日(nanoka)」 (seven days), 「薬(kusuri)」 (medicine) and 「あり(ari)」 (have). Moreover, words belonging to the same class as a class which appears in the "Source language components:" field shall be considered as appearing in the "Source language components:". For example, as shown in FIG. 3, 「7 日(nanoka)」 (seven days) is a member-word of the class-word 日数(nissu)> (number of days), and 「薬(kusuri)」 (medicine) is a member-word of the class-word <薬 (kusuri)> (medicine). Therefore, both are words appearing in the "Source language components:" field.

The sample sentence selection unit 108 scans a "Source language dependence relationship:" field, and sequentially verifies the dependence relationships for each of the sample sentences in the sample sentence database 105. Subsequently, sample sentences are sequentially selected from among sample sentences having one or more dependence relationships, in the order of most dependence relationships established. In the sample sentences shown in FIG. 2 for example, as 「かかり(kakari)」 (take) is not present among the collection of important words, the number of dependence relationships established is "0". With regard to sample sentence 204, 「何か(nanika)」 (any) is not present among the collection of important words. Therefore, among the dependence lo relationships of components, dependency is not established between the encircled numbers (1→2) but established for the encircled numbers (2→3). Accordingly, the number of established dependence relationships is "1".

When the sample sentence selection unit 108 is designed to select, from within the sample sentence database 105, a sample sentence having one or more dependency relationships established, sample sentence 204 is selected without sample sentence 203 being selected. In the succeeding explanation, explanation shall be made under the assumption that as other sample sentences within the sample sentence database 105, 「薬ですか(kusuridesuka)」 (Is this medicine?) and 「薬です(kusuridesu)」 (This is medicine) are selected in the same manner.

Figure 7:
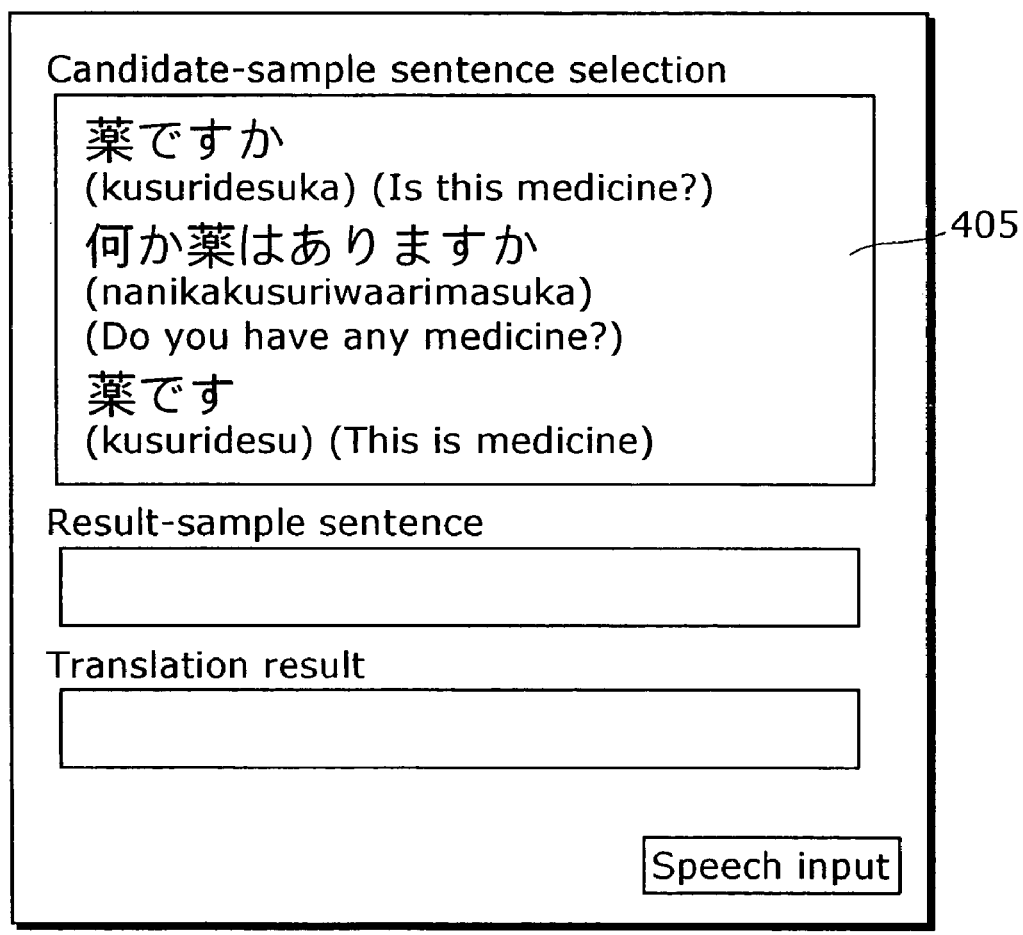
FIG. 7 is a diagram showing an example of details displayed by the GUI unit in an embodiment of the dialogue supporting apparatus in the present invention.

The control unit 101 transmits the sample sentences transmitted from the sample sentence selection unit 108 to the GUI unit 102. The GUI unit 102 displays the selected sample sentence on the candidate-sample sentence selection area 405, as shown in FIG. 7 (step S504).

Figure 8:
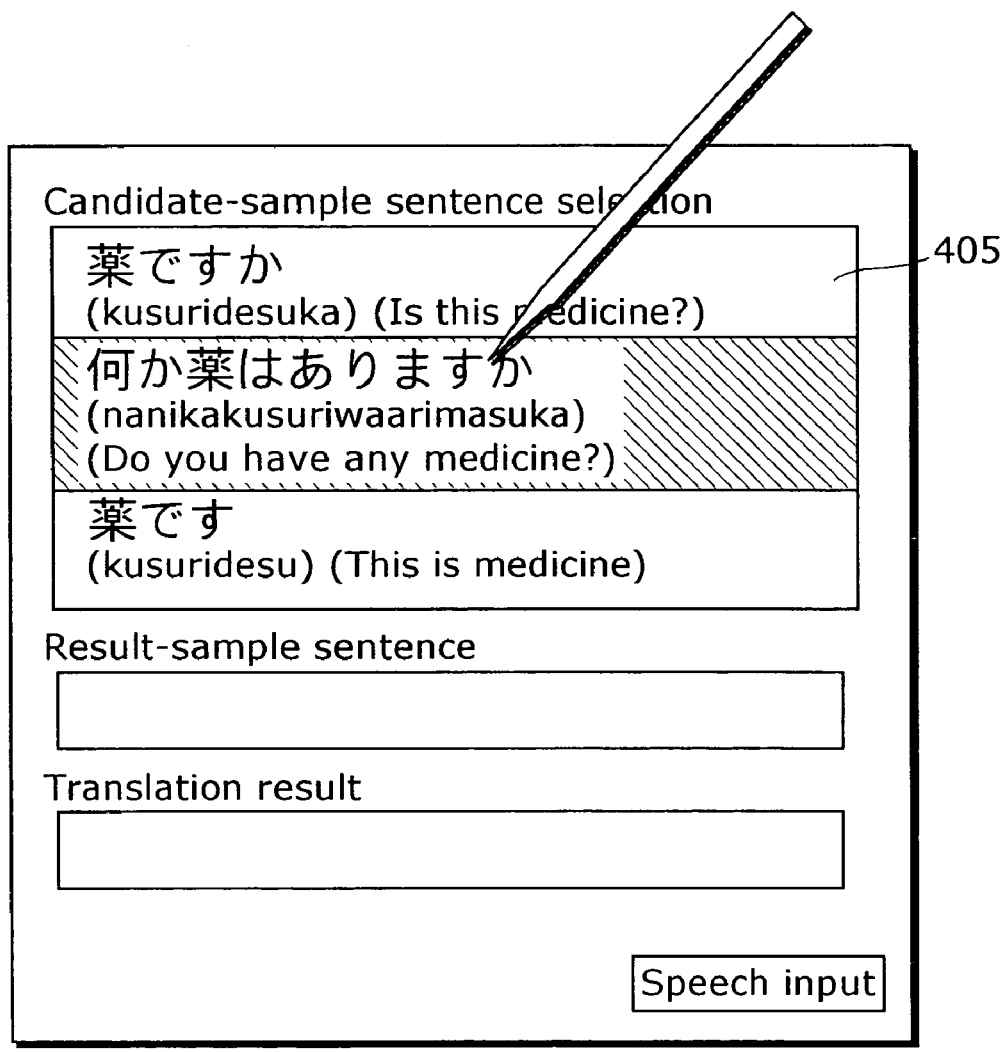
FIG. 8 is a diagram showing an example of details displayed by the GUI unit in an embodiment of the dialogue supporting apparatus in the present invention.
Figure 9:
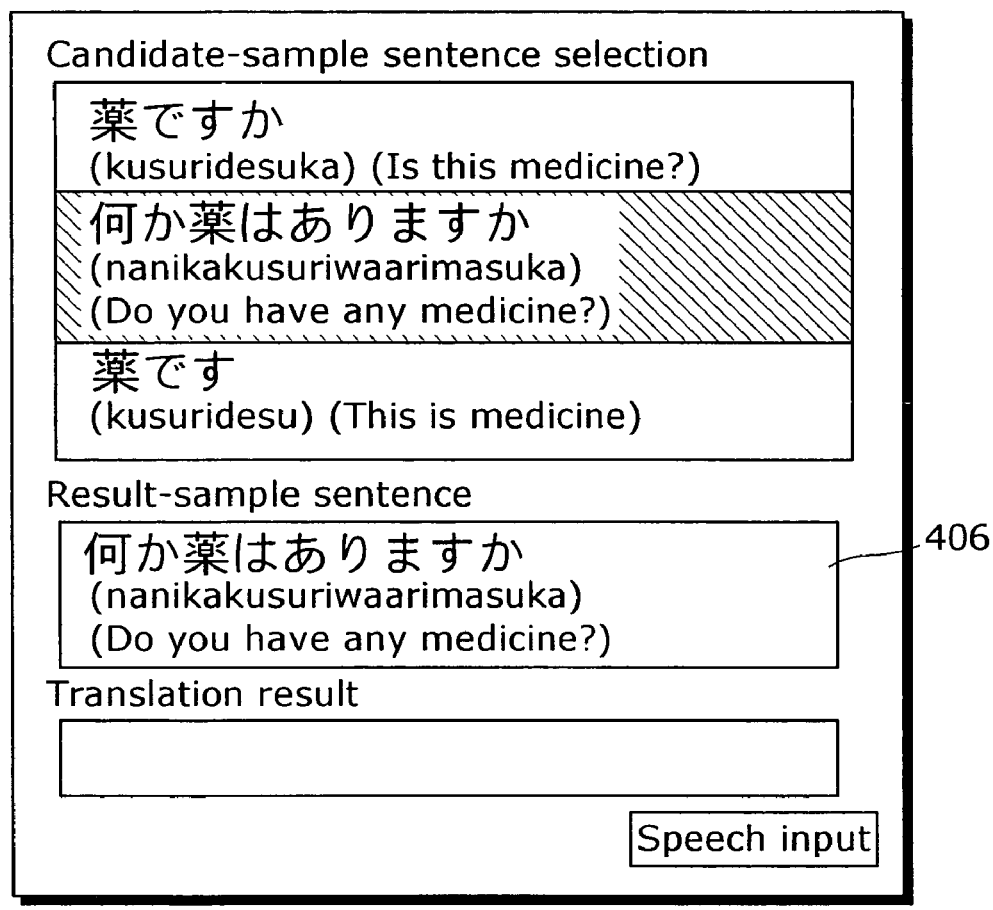
FIG. 9 is a diagram showing an example of details displayed by the GUI unit in an embodiment of the dialogue supporting apparatus in the present invention.

When the user selects one of the sample sentences, 「何か薬はありますか(nanikakusuriwaarimasuka)」 (Do you have any medicine?), displayed in the candidate-sample sentence selection area 405 as shown in FIG. 8, the control unit 101 sets such sample sentence in the sample sentence selection result display area 406, as shown in FIG. 9 (step S505). Furthermore, after a sample sentence is selected by the user, the control unit 101 commands the word selection unit 109 to extract classified words from within the sample sentence. In this example, 「薬(kusuri)」 (medicine) is extracted. The control unit 101 transmits the word to the GUI unit 102, and the GUI unit 102 underlines 「薬(kusuri)」 (medicine), displayed in the sample sentence selection result display area 406, to indicate that it is a user-changeable word.

Figure 10:
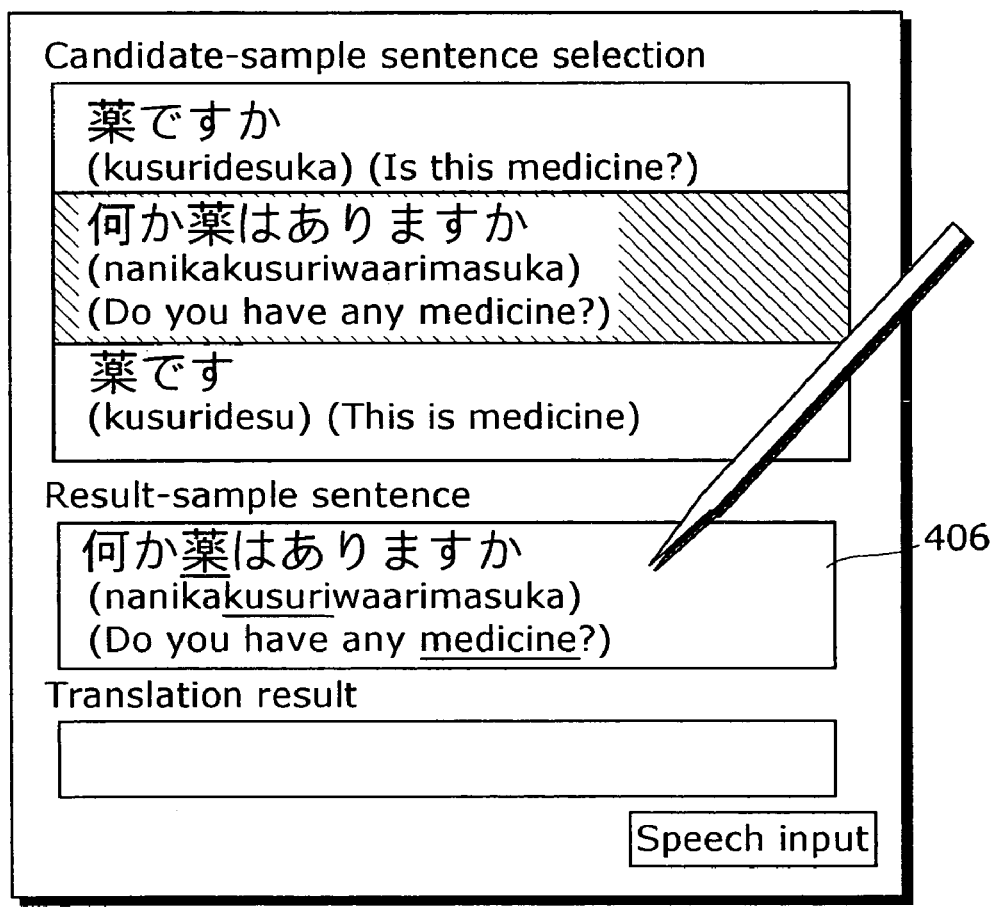
FIG. 10 is a diagram showing an example of details displayed by the GUI unit in an embodiment of the dialogue supporting apparatus in the present invention.
Figure 11:
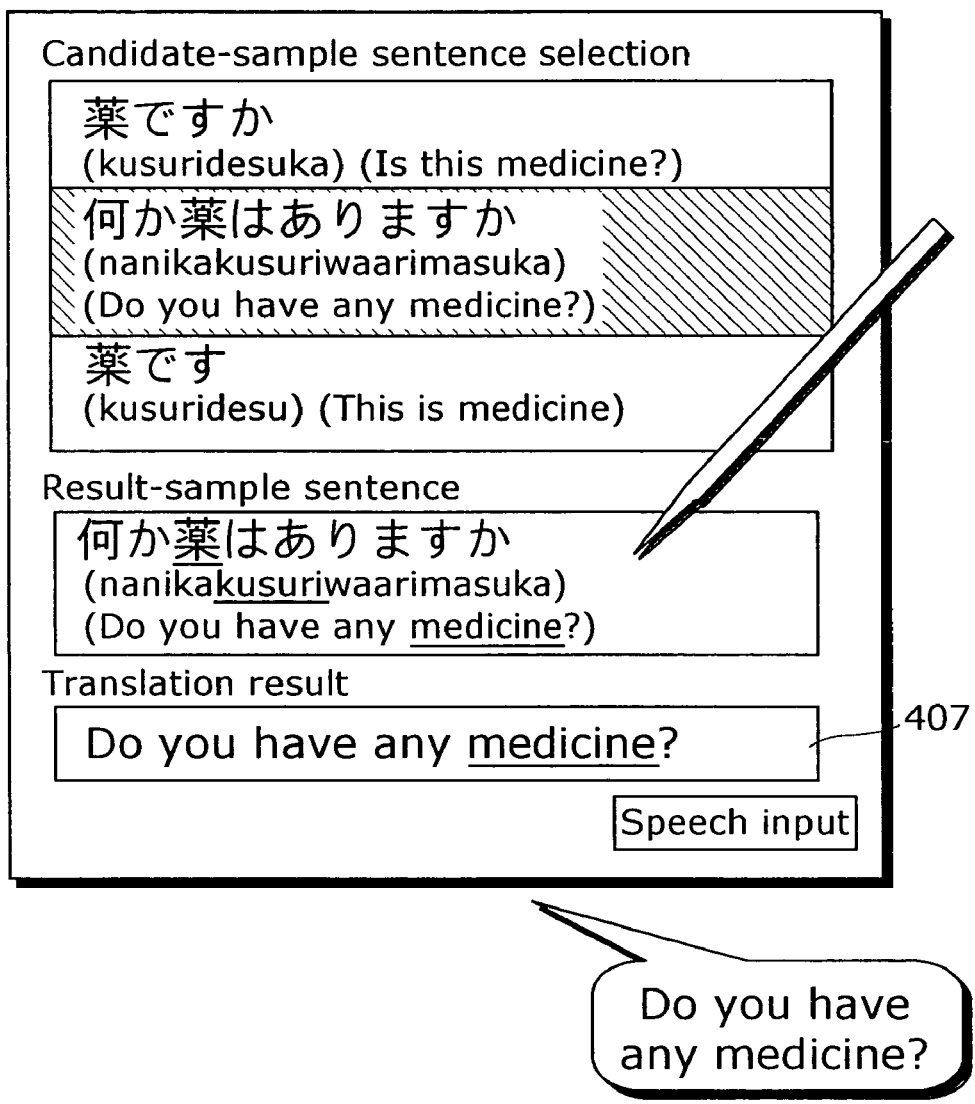
FIG. 11 is a diagram showing an example of details displayed by the GUI unit in an embodiment of the dialogue supporting apparatus in the present invention.

Next, the control unit 101 decides whether to change the word within the selected sample sentence or to perform translation (step S506). In other words, as shown in FIG. 10, when a display area of the sample sentence selection result display area 406 other than the sentence is clicked on, the control unit 101 decides to perform translation. In this case, the sample sentence that has been decided upon is transmitted to the control unit 101, and the control unit 101 transmits this to the language conversion unit 111. By extracting the "Target language" field of the currently selected sample sentence using the sample sentence database 105, the language conversion unit 111 converts the sentence to "Do you have any medicine?", and transmits the conversion result to the control unit 101 (step S511). As shown in FIG. 11, the control unit 101 transmits the conversion result to the GUI unit 102 and the speech synthesizer unit 113. The GUI unit 102 displays the conversion result on the translation result display area 407. At the same time, the conversion result is performed of speech synthesis by the speech synthesizer unit 113, then transmitted to the speech output unit 114, and outputted from the speaker 402 (step S512).

Figure 12:
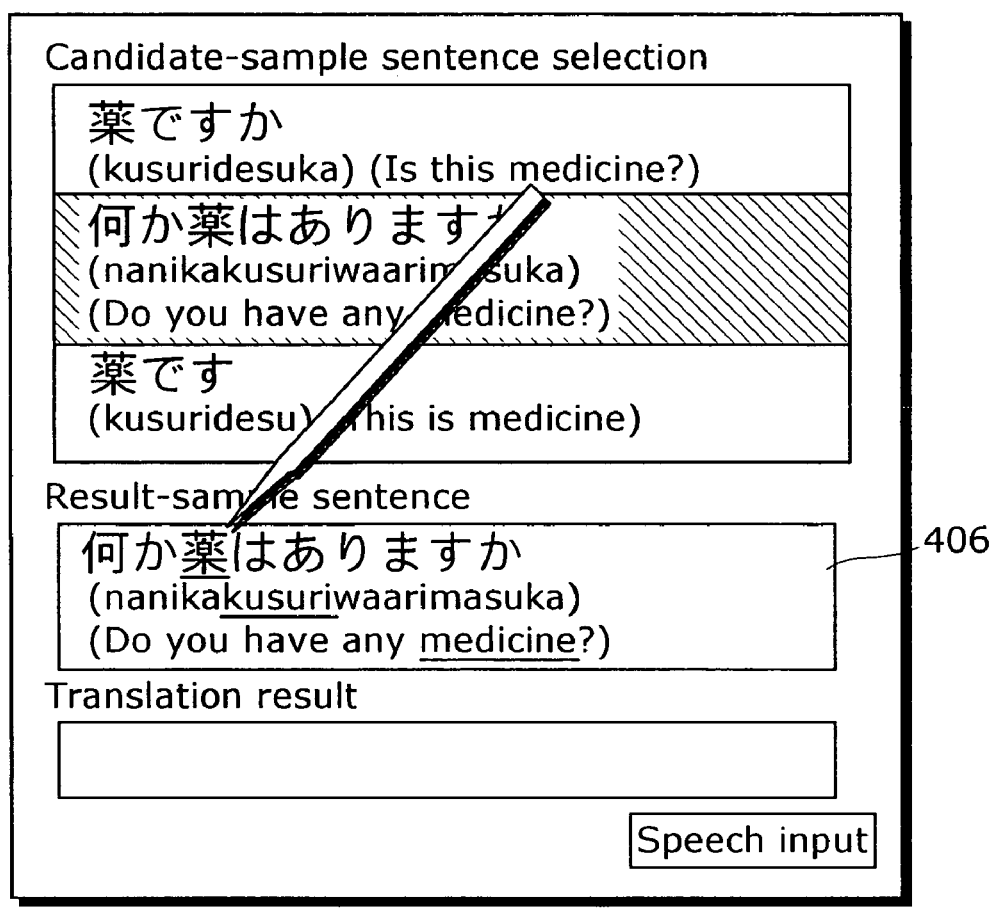
FIG. 12 is a diagram showing an example of details displayed by the GUI unit in an embodiment of the dialogue supporting apparatus in the present invention.

On the other hand, when the user clicks on the underlined word area of the sentence in the sample sentence selection result display area 406, as shown in FIG. 12, the control unit 101 decides to change the word within the sample sentence. In this case, the control unit 101 transmits, to the alternative word selection unit 110, the word 「薬(kusuri)」 (medicine) selected by the user. Referring to the class-word information 106, the alternative word selection unit 110 extracts and transmits to the control unit 101, 「アスピリン(asupirin)」 (aspirin), 「風邪薬(kazegusuri)」 (cold medicine), 「トローチ(torôchi)」 (troche), and 「胃腸薬(ichouyaku)」 (digestive medicine), which are member-words of the same class as the word 「薬(kusuri)」 (medicine) selected by the user (step S507).

Figure 13:
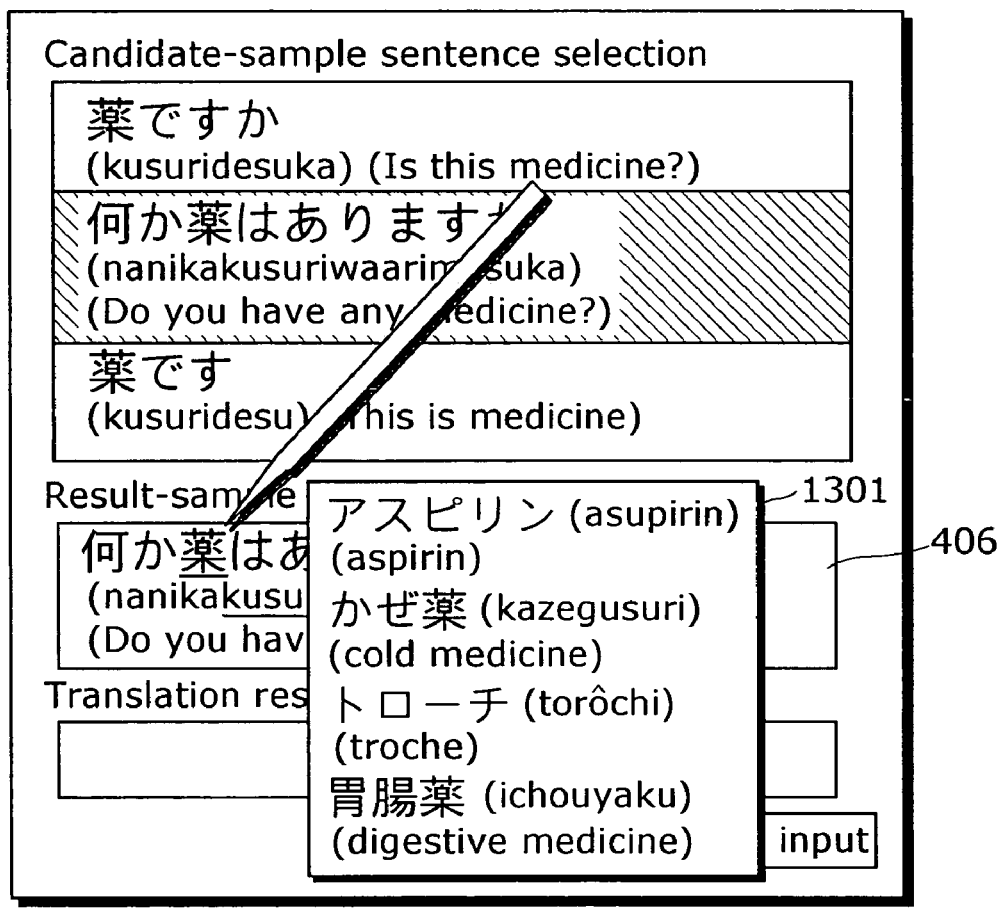
FIG. 13 is a diagram showing an example of details displayed by the GUI unit in an embodiment of the dialogue supporting apparatus in the present invention.

Next, the control unit 101 transmits the list of alternative words to the GUI unit 102, and as shown in FIG. 13, the GUI unit 102 lo displays the list of alternative words in a list window 1301 (step S508).

Figure 14:
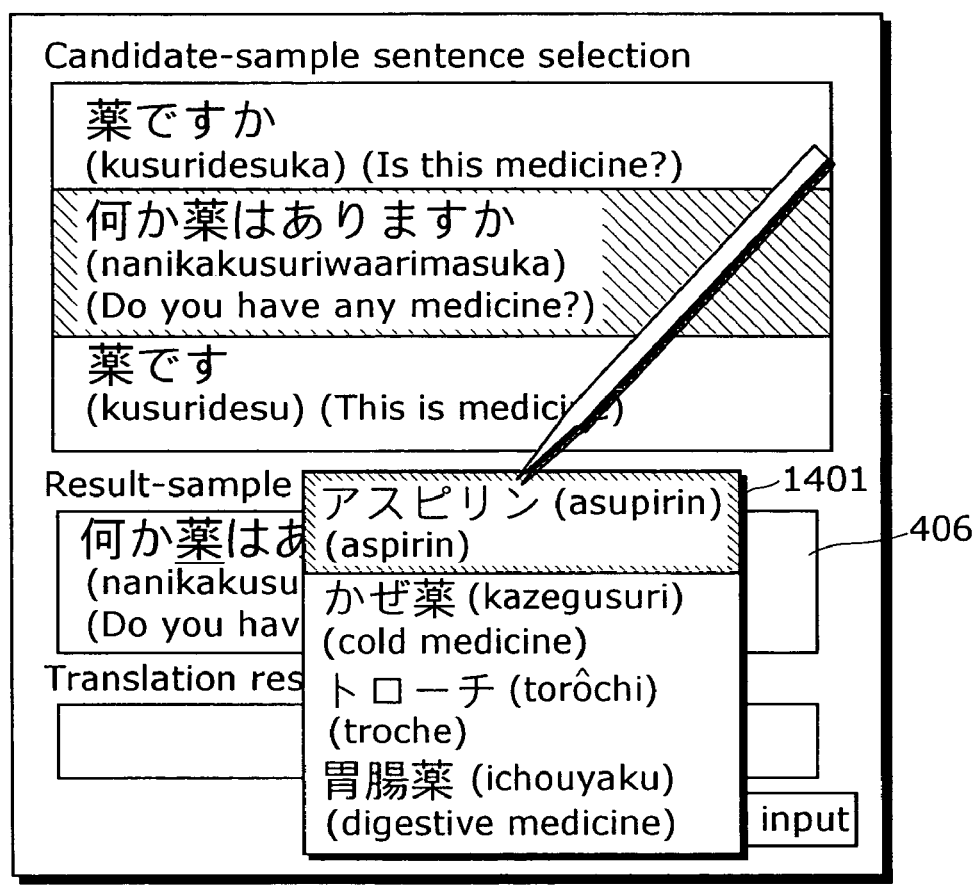
FIG. 14 is a diagram showing an example of details displayed by the GUI unit in an embodiment of the dialogue supporting apparatus in the present invention.

When the user clicks on and selects an alternative word 1401, which is the desired word, from within the alternative word list shown in the list window 1301 shown in FIG. 14, the GUI unit 102 obtains the alternative word 「アスピリン(asupirin)」 (aspirin) and transmits this to the control unit 101 (step S509).

Figure 15:
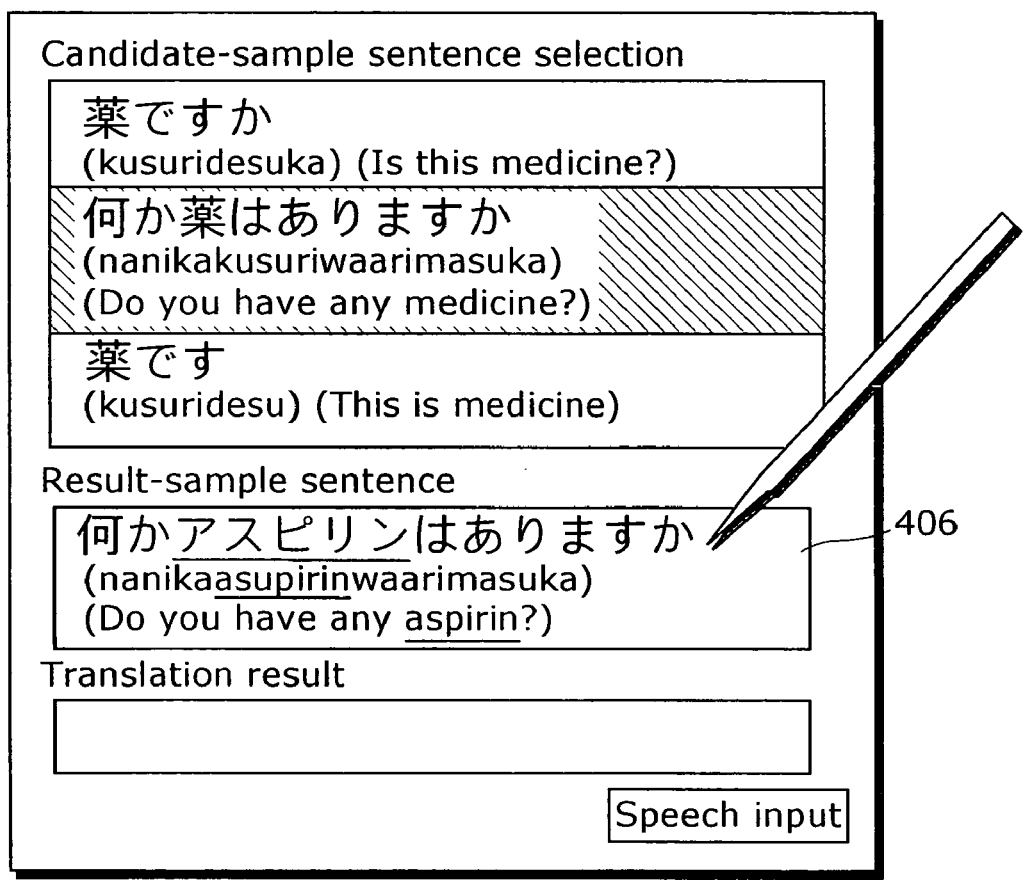
FIG. 15 is a diagram showing an example of details displayed by the GUI unit in an embodiment of the dialogue supporting apparatus in the present invention.

Using the alternative word 「アスピリン(asupirin)」 (aspirin) selected by the user, the control unit 101 converts the sample sentence to 「何かアスピリンはありますか(nanikaasupirinwaarimasuka)」 (Do you have any aspirin?). Subsequently, as shown in FIG. 15, the GUI unit 102 converts the sample sentence displayed on the sample sentence selection result display area 406 to 「何かアスピリンはありますか(nanikaasupirinwaarimasuka)」 (Do you have any aspirin?) and displays the conversion result (step S510). Then, the process returns to the decision process of whether to change the word within the sample sentence or to perform translation (step S506).

Figure 16:
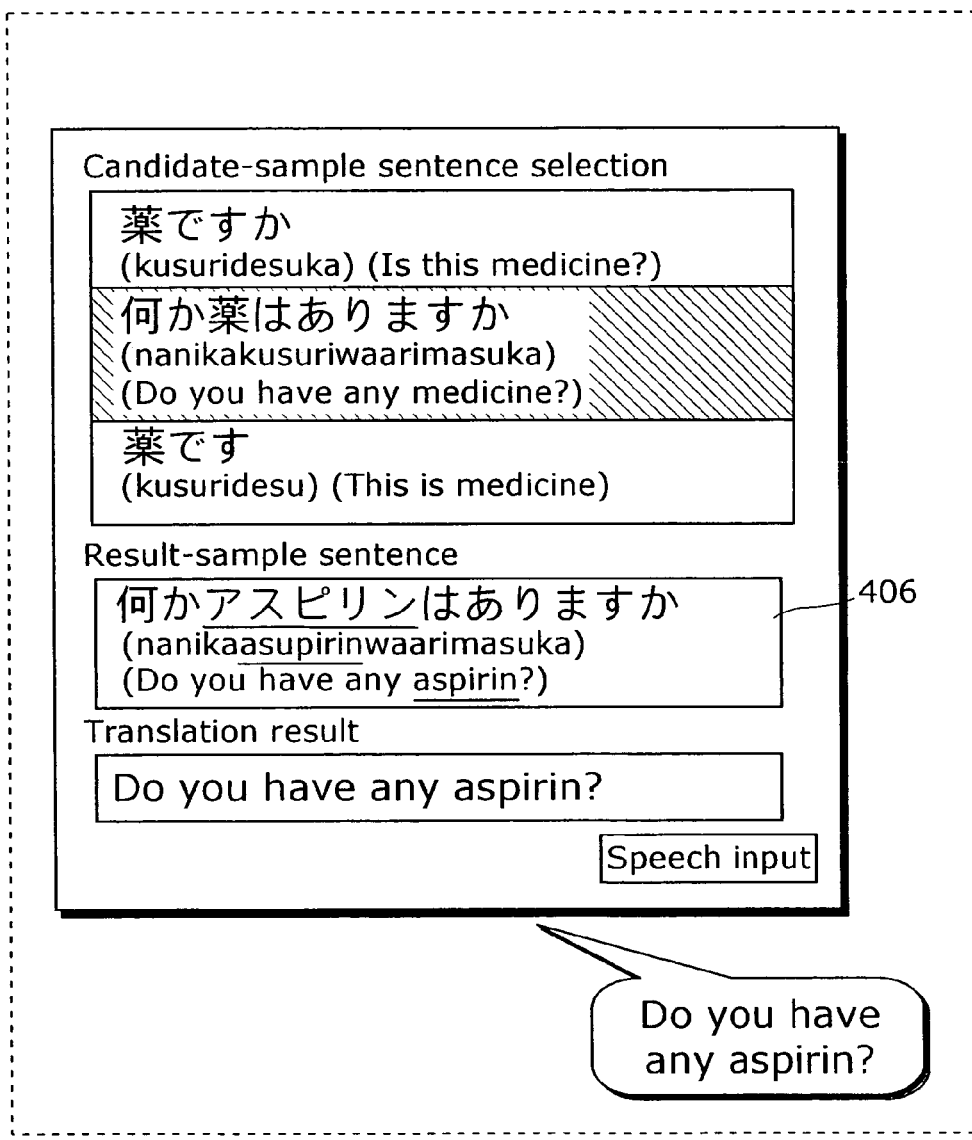
FIG. 16 is a diagram showing an example of details displayed by the GUI unit in an embodiment of the dialogue supporting apparatus in the present invention.

Subsequently, the same process (step S507 to S510) is repeated as necessary. As shown in FIG. 16, when the user decides on the sample sentence through the aforementioned decision process (step S506), 「何かアスピリンはありますか(nanikaasupirinwaarimasuka)」 (Do you have any aspirin?) is converted to the target language "Do you have any aspirin?" and synthesized speech is outputted.

Next, the operation of the dialogue supporting apparatus 100 when added with the sample sentence comparison unit 112 shall be explained.

Figure 18:
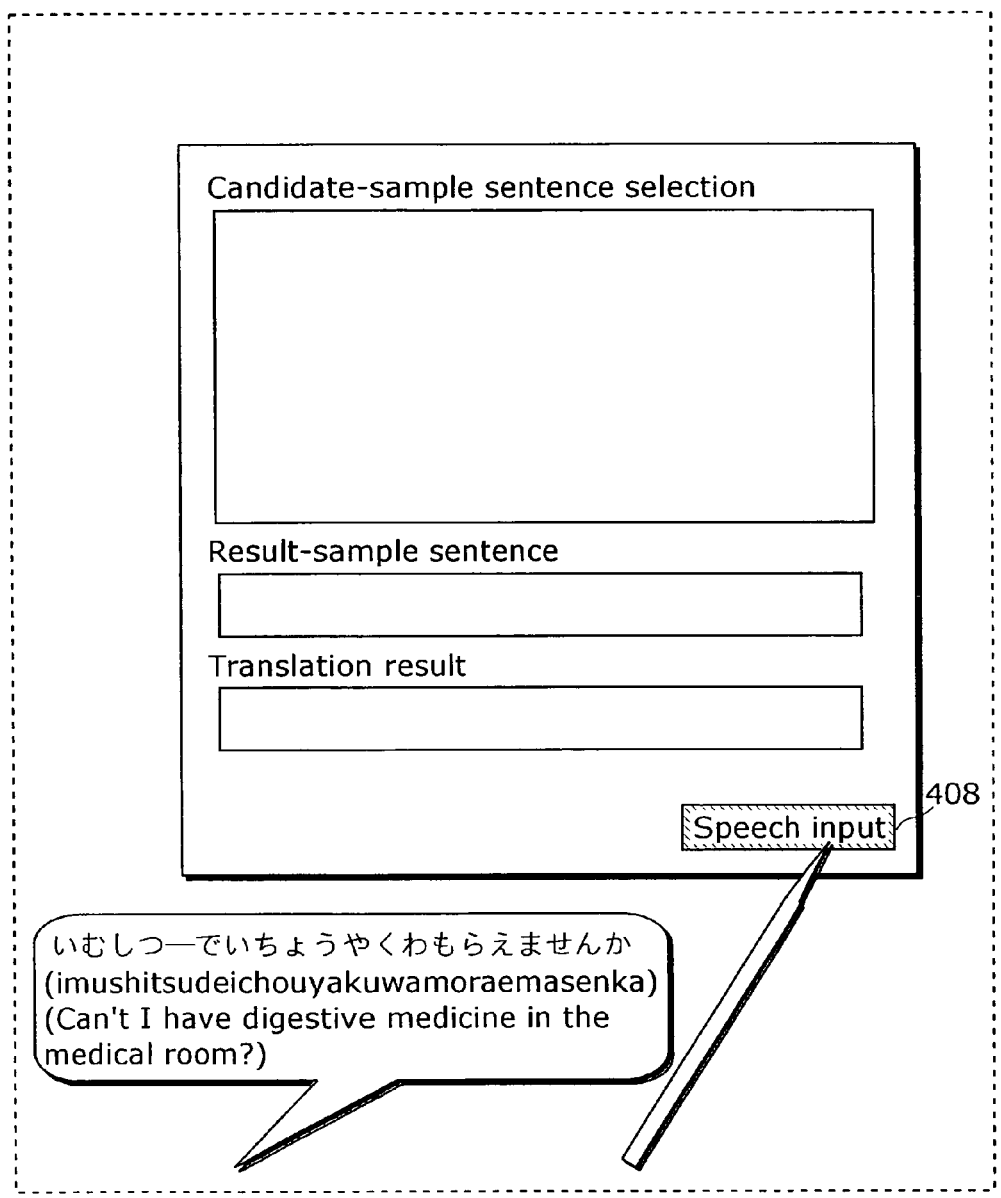
FIG. 18 is a diagram showing an example of PDA usage by a user in an embodiment of the dialogue supporting apparatus in the present invention.

Hereinafter, explanation shall be carried out using another specific example of the sample sentence database 105, shown in FIG. 17. Here, it is assumed that the user utters 「いむしつーでいちょうやくわもらえませんか (医務室、で胃腸薬はもらえませんか？)」 (imushitsudeichouyakuwamoraemasenka)」 (Can't I have medicine in the medical room?) after pressing the button 408, as shown in FIG. 18, and 「売ほしい胃腸薬もらあり(u hoshii ichouyaku mora ari)」 (buy want digestive medicine have is) (ウホシイイチョウヤクモラアリ (UHOSHIICHOUYAKUMORAARI) is obtained as the result of speech recognition. Moreover, in the case where the sample sentence comparison unit 112 is not added, one dependence relationship is established for each of sample sentence 1701 to 1704. Accordingly, the sample sentence selection unit 108 outputs all the four sample sentences as candidates, and the user must decide on a desired sample sentence while viewing the many sample sentences displayed on the candidate-sample sentence selection area 405.

Figure 19:
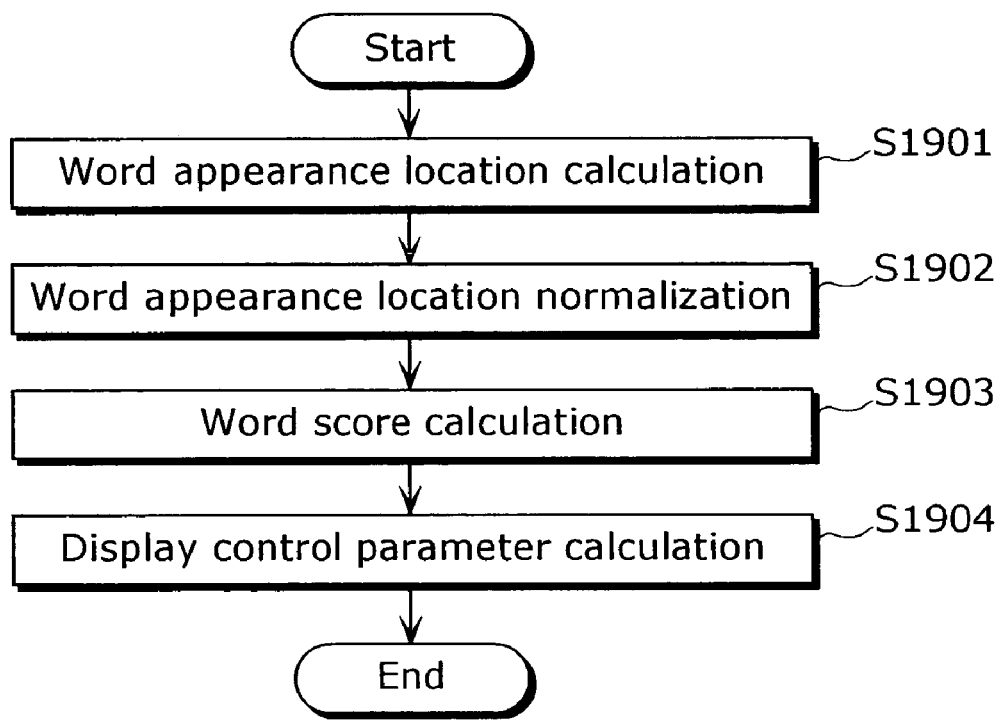
FIG. 19 is a flowchart showing the flow of operation of the sample sentence comparison unit in an embodiment of the dialogue supporting apparatus in the present invention.

FIG. 19 is a flowchart showing the flow of operation of the sample sentence comparison unit 112. Moreover, the operation of the sample sentence comparison unit 112 takes place between the sample sentence search process (step S503) and the sample sentence display process (step S504) in FIG. 5.

The sample sentence comparison unit 112 first calculates the appearance location of words in all of the sample sentences outputted by the sample sentence selection unit 108 as candidates, appearing in the speech recognition result (step S1901). A sample sentence is converted to a Japanese phonetic inscription character string with the use of the word dictionary 107, and the location (number of characters) in the character string is used as the appearance location. For example, sample sentence 1701 is converted into a katakana character string, as shown in FIG. 20B. Assuming that small characters such as 「ョ(consonant+"yo" sound, as in cho)」 are not counted as one character, with regard to sample sentence 1701, 「胃腸薬(ichouyaku)」 (digestive medicine) appearing in the speech recognition result, appears in location "0" and 「ほしい(hoshii)」 (want) appears in location "6", as shown in sample sentence 2001. In the same manner, the sample sentence comparison unit 112 also calculates the appearance location of each word in the speech recognition result. For example, as shown in FIG. 20A, the word 「胃腸薬(ichouyaku)」 (digestive medicine) included in the speech recognition result has a location of "4".

Next, the sample sentence comparison unit 112 normalizes the appearance location of the words using the length of the Japanese phonetic inscription character string (step S1902). For example, the length of the Japanese phonetic inscription for sample sentence 1701 is 13 words and the appearance location of 「胃腸薬(ichouyaku)」 (digestive medicine) and 「ほしい(hoshii)」 (want) are normalized as 0/13=0 and 6/13=0.46, respectively. In the same manner, the sample sentence comparison unit 112 also normalizes the appearance location of each word in the speech recognition result. For example, as shown in FIG. 20A, the location of 「胃腸薬(ichouyaku)」 (digestive medicine) included in the speech recognition result, is normalized as 4/13=0.31.

Next, the sample sentence comparison unit 112 calculates, from the location of a word within a sample sentence and the location of a word in the speech recognition result, the word score for every word in each sample sentence, that is included in the speech recognition result (step S1903). The word score is calculated using the following formula:

(Word score)=(location in sample sentence)−(location in speech recognition result)

For example, with regard to sample sentence 1703, the score for 「胃腸薬(ichouyaku)」 (digestive medicine) is 0.29−0.31=0.2, and the score for 「もら(mora)」 (have) is 0.65−0.69=−0.04, as shown in sample sentence 2101 in FIG. 21.

Next, the sample sentence comparison unit 112 derives a display parameter for each word of each sample sentence, based on the calculated word scores (step S1904). For example, when a parameter is previously set in which an underline is placed when the absolute value for a word score is 0.1 or lower, the GUI unit 102 places an underline under 「胃腸薬(ichouyaku)」 (digestive medicine) and 「もら (mora)」 (have) of sample sentence 1703 and 「胃腸薬(ichouyaku)」 (digestive medicine) of sample sentence 1704, which fall under such condition, and displays these candidate sample sentences on the candidate-sample sentence selection area 405, as shown in FIG. 22. As such, the user, guided by the sample sentences with underlines, can easily and promptly select the sample sentence 「医務室で胃腸薬はもらえますか(imushitsudeichouyakuwamoraemasuka)」 (Can I have medicine in the medical room?), from among the many candidate-sample sentences.

Figure 23:
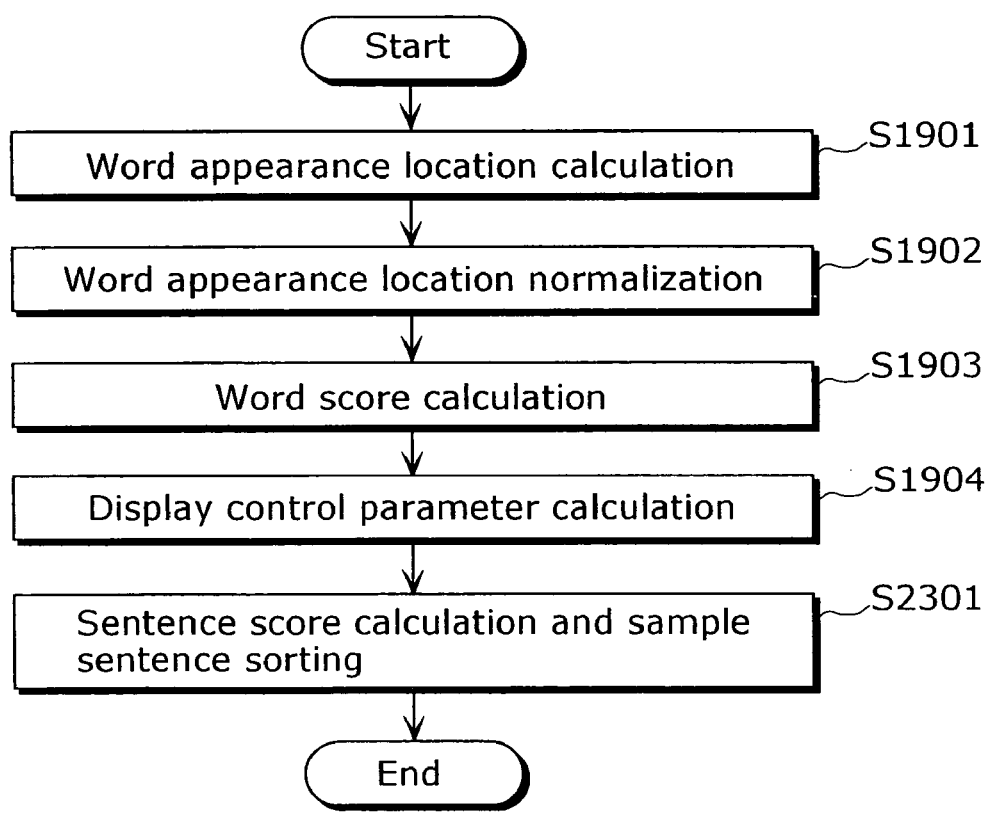
FIG. 23 is a diagram showing an example of the flow of operation of the sample sentence comparison unit in an embodiment of the dialogue supporting apparatus in the present invention.

Furthermore, although the sample sentence comparison unit 112 calculates the display parameter based on the word score in the explanation above, in addition, it also is possible to change the display order of the sample sentences by deriving a sentence score (sentence correspondence degree) on a per-sample sentence basis. FIG. 23 is a flowchart showing the flow of operation of the sample sentence comparison unit 112 in such a case. Moreover, the operation from the appearance location calculation process (step S1901) up to the display parameter derivation process (step S1904) is the same as in the previous description.

The sample sentence comparison unit 112 calculates the number of words having a word score absolute value of, for example, 0.1 or lower, as the sentence score for each sample sentence (step S2301). With respect to the example shown in FIG. 21, a sentence score 2401 shown in FIG. 24, is calculated. By rearranging the sample sentences outputted by the sample sentence selection unit 108 according to highest sentence score, the candidates are displayed on the candidate-sample sentence selection area 405, as shown in FIG. 25. Accordingly, the user, looking from the top of the candidate-sample sentence selection area 405 and guided by the sample sentences with underlines, can further easily and promptly select the sample sentence 「医務室で胃腸薬はもらえますか(imushitsudeichouyaku-wamoraemasuka)」 (Can I have medicine in the medical room?), from among the many candidate-sample sentences.

Here, although rearrangement of sample sentences is performed based on the sentence score, it is not limited to such, and it is possible to display a sample sentence having, for example, a sentence score equaling or exceeding a predetermined value, by highlighting the entire sentence.

Next, the operation of the present embodiment shall be explained in the case where the sample sentence comparison unit 112 processes English as the source language. Moreover, although explanation shall be carried out using the flowchart in FIG. 19 as the flow of operation in such a case is the same as in the previously described case where the source language is Japanese, the respective details of operation differ.

Figure 27:
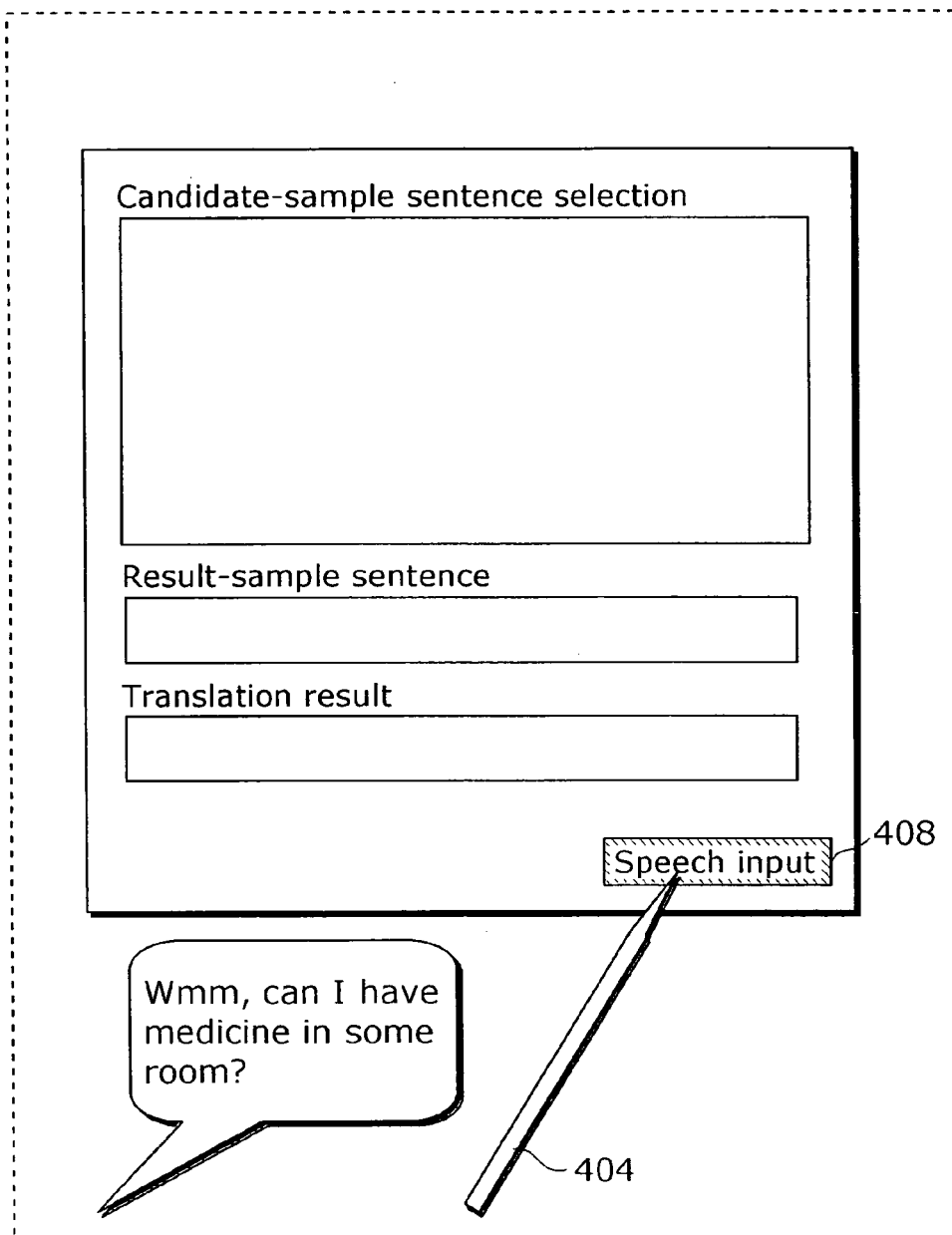
FIG. 27 is a diagram showing an example of PDA usage by a user in an embodiment of the dialogue supporting apparatus in the present invention.

Hereinafter, explanation shall be made using another specific example of the sample sentence database 105, shown in FIG. 26. The dialogue supporting apparatus 100 performs conversion from English to Japanese. As shown in FIG. 27, it is assumed that when the user utters "Wmm, can I have medicine in some room?" after pressing the button 408, "want I have medicine in sell room" is obtained as the result of speech recognition. Moreover, in the case where the sample sentence comparison unit 112 is not (added, one dependence relationship is established for each of sample sentence 2601 to sample sentence 2604. Accordingly, the sample sentence selection unit 108 outputs all the four sample sentences as candidates, and the user must decide on a desired sample sentence while viewing the many sample sentences displayed on the candidate-sample sentence selection area 405.

In the case where the source language is English, the sample sentence comparison unit 112 first calculates the appearance location of the words in all the sample sentences outputted by the sample sentence selection unit 108 as candidates, appearing in the speech recognition result, (step S1901). A sample sentence is converted to a pronunciation symbol character string with the use of the word dictionary 107, and the location (number of characters) in the character string is used as the appearance location. For example, sample sentence 2601 is converted into a pronunciation symbol character string, as shown in FIG. 28B.

Here, a rule is applied in which consonants inscribed in italics, in other words consonants uttered lightly, are deleted in the conversion to pronunciation symbols. Furthermore, with regard to the count of the number of words for the converted pronunciation symbols, counting is varied, depending on the type of the letter, in accordance to the following rules: (1) spaces between words are not counted; (2) consonants are counted as 0.5 letters; (3) vowels (a, i, and so on) are counted as 1 character; (4) long vowels (a:, and so on) are counted as 2 characters.

By counting according to such a rule, with regard to sample sentence 2801, "want" appearing in the speech recognition result, appears in location "2" and "medicine" appears in location "4.5", as shown in sample sentence 2801. In the same manner, the sample sentence comparison unit 112 also calculates the appearance location of each word in the speech recognition result. For example, the word "medicine" included in the speech recognition result has a location of "6.5", as shown in FIG. 28A.

Next, the sample sentence comparison unit 112 normalizes the appearance location of the words using the length of the pronunciation symbol character string (step S1902). For example, the length of the pronunciation symbols for sample sentence 2801 is 7.5 words, and the appearance location of "want" and "medicine" are normalized as 2/7.5=0.27 and 4.5/7.5=0.60, respectively. In the same manner, the sample sentence comparison unit 112 also normalizes the appearance location of each word in the speech recognition result. For example, as shown in FIG. 28A, the location of "medicine" included in the speech recognition result, is normalized as 6.5/16=0.46.

Next, the sample sentence comparison unit 112 calculates, from the location of a word within a sample sentence and the location of a word in the speech recognition result, the word score for every word in each sample sentence, that is included in the speech recognition result (step S1903). The word score is calculated using the following formula:

(Word score)=(location in sample sentence)−(location in speech recognition result)

For example, as shown in sample sentence 2901 in FIG. 29, with regard to sample sentence 2603, the score for "have" is 0.24−0.28=−0.04, and the score for "medicine" is 0.36−0.46=−0.10.

Figure 30:
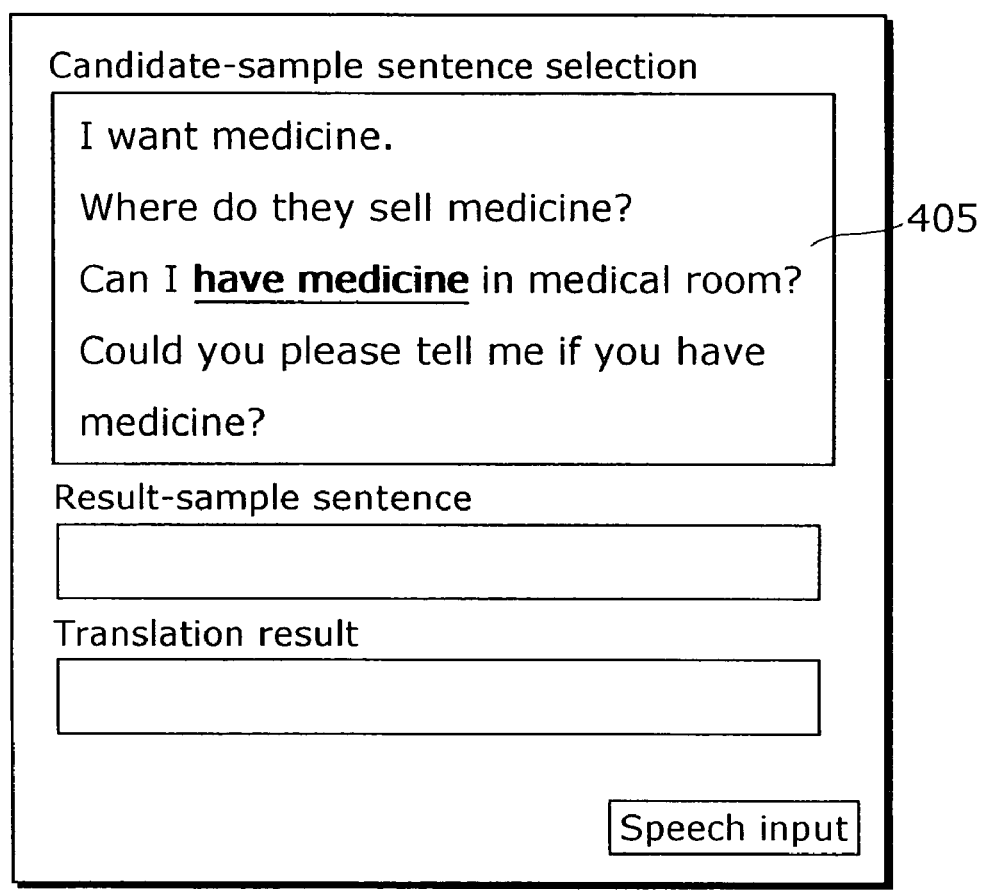
FIG. 30 is a diagram showing an example of details displayed by the GUI unit in an embodiment of the dialogue supporting apparatus in the present invention.

Next, the sample sentence comparison unit 112 derives a display parameter for each word of each sample sentence, based on the calculated word scores (step S1904). For example, when a parameter is previously set in which an underline is placed when the absolute value for a word score is 0.10 or lower, the GUI unit 102 places an underline under "have" and "medicine" of sample sentence 2603, which fall under such condition, and displays the candidate sample sentences on the candidate-sample sentence selection area 405, as shown in FIG. 30. Accordingly, the user, guided by the sample sentences with underlines, can easily and promptly select the sample sentence "Can I have medicine in medical room?" from among the many candidate-sample sentences.

Figure 32:
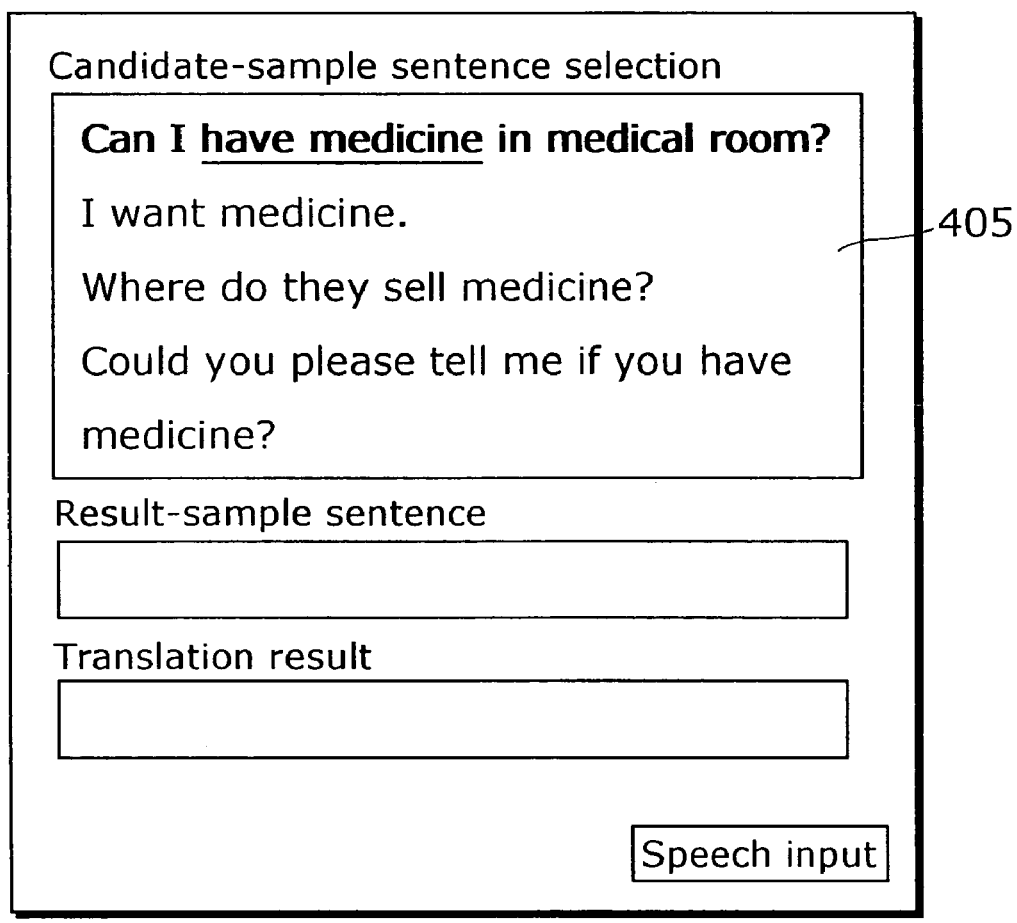
FIG. 32 is a diagram showing an example of details displayed by the GUI unit in an embodiment of the dialogue supporting apparatus in the present invention.

Furthermore, in the same manner as in the conversion from Japanese to English, the sample sentence comparison unit 112 can change the display order of the sample sentences by deriving a sentence score (sentence correspondence degree) for each of the sentences. For example, when the sentence score is calculated as the number of words having a word score absolute value of 0.10 or lower, a sentence score 3101 shown in FIG. 31, is calculated with respect to the example shown in FIG. 29. By rearranging the sample sentences outputted by the sample sentence selection unit 108 according to the highest sentence score, the candidates are displayed on the candidate-sample sentence selection area 405 as shown in FIG. 32. Accordingly, the user, looking from the top of the candidate-sample sentence selection area 405, and guided by the sample sentences with underlines, can further easily and promptly select the sample sentence "Can I have medicine in medical room?" from among the many candidate-sample sentences.

Moreover, although explanation was carried out with the user's input to the GUI unit 102 being limited to the respective touch-panel inputs and button inputs in the aforementioned explanation, it is possible for words and sample sentences to be selected and decided on through speech, using the speech recognition process. Furthermore, operation through a combination of the respective input modalities of touch-panels, buttons, and speech is also possible. In addition, although Japanese and English are given as an examples, the present invention is not dependent on the language and can be implemented in the same manner even for other languages such as Chinese, and so on.

Furthermore, the language model used within the speech recognition unit 104 is constructed centering on the sentences in the "Source language:" field of the sample sentences held by the sample sentence database 105. In general, in order to construct a language model, it is necessary to break down a sentence into the smallest units such as a morpheme, and the output of the speech recognition unit 104 is the grouping of such smallest units. The information in the word dictionary 107 can be used in the break down to the smallest units. Furthermore, a language model can be constructed by performing a break down which is more detailed than in the word dictionary 107, and this can be outputted as the output of the speech recognition unit 104, after being formed into a word that is registered in the word dictionary 107.

Furthermore, aside from placing an underline under a coinciding word, the control of the display parameter by the sample sentence comparison unit 112 can also use various display methods such as the shading of the color of characters and the blinking of the characters. Furthermore, with respect to the rearrangement of candidate-sample sentences by sentence score performed by the sample sentence comparison unit 112, the display parameter can be controlled, on a per sample sentence basis in accordance with the sentence score, such as by thinning-out the display color of a sample sentence having a low score, and so on.

Furthermore, although explanation is made in the present embodiment regarding the dialogue supporting apparatus, the present invention is not limited to such, and can also be applied as a sample sentence searching apparatus which searches out a sample sentence corresponding to an inputted sentence.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

As in the aforementioned manner, the dialogue supporting apparatus in the present invention includes a function for easily searching out a desired sample sentence with the use of speech, and is useful for providing on, for example, a mobile phone, portable terminal, and the like, translation language corresponding to inputted source language. Furthermore, the present invention can also be applied to applications in public street-side terminal devices and guidance terminal devices.

What is claimed is:

1. A dialogue supporting apparatus for recognizing a speech input in a source language and for presenting a translation of the input speech in a target language, the dialogue supporting apparatus comprising:
   a speech recognition unit operable to receive the speech input in the source language and to obtain a speech recognition result of the speech input, the speech recognition result being in the source language;
   a sample sentence search unit operable to search for and obtain a sample sentence in the source language based on a keyword included in the obtained speech recognition result;
   a sample sentence comparison unit operable to derive a keyword correspondence degree by comparing (i) a location of the keyword within the obtained sample sentence that is in the source language, and (ii) a location of the keyword within the speech recognition result that is in the source language, the keyword correspondence degree indicating a degree of correspondence between the location of the keyword within the obtained sample sentence and the location of the keyword within the speech recognition result; and
   a sample sentence display control unit operable to display the obtained sample sentence in the source language, and to highlight the keyword within the displayed sample sentence based on the derived keyword correspondence degree.

2. The dialogue supporting apparatus according to claim 1, wherein the sample sentence comparison unit is operable to derive, based on the keyword correspondence degree, a display parameter for highlighting the keyword in the displayed sample sentence, and
   wherein the sample sentence display control unit is operable to highlight the keyword within the displayed sample sentence based on the display parameter.

3. The dialogue supporting apparatus according to claim 1, wherein the sample sentence comparison unit is operable to determine the location of the keyword within the obtained sample sentence and the location of the keyword within the speech recognition result, using an appearance location in a character string of one of Japanese phonetic inscription and pronunciation symbols, and to normalize the appearance location using a length of the character string of one of the Japanese phonetic inscription and the pronunciation symbols.

4. The dialogue supporting apparatus according to claim 3, wherein the sample sentence comparison unit is operable to change the number of characters in one of the Japanese phonetic inscription and pronunciation symbols depending on a character type, and to count the number of changed characters, when determining the location of the keyword within the obtained sample sentence and the location of the keyword within the speech recognition result, using the appearance location in a character string of one of Japanese phonetic inscriptions and pronunciation symbols.

5. The dialogue supporting apparatus according to claim 4, wherein the sample sentence comparison unit is operable to change the number of characters depending on whether the character type is any of a short sound, a prolonged sound, and a choked sound, of the Japanese phonetic inscriptions, and to count the number of changed characters, when the source language is Japanese.

6. The dialogue supporting apparatus according to claim 4, wherein the sample sentence comparison unit is operable to change the number of characters depending on whether the character type is any of a vowel, a long vowel, and a consonant, of the pronunciation symbols, and to count the number of changed characters, when the source language is English.

7. The dialogue supporting apparatus according to claim 3, wherein the sample sentence comparison unit is operable to adopt as the keyword correspondence degree, a difference between the location of the keyword within the obtained sample sentence and the location of the keyword within the speech recognition result.

8. The dialogue supporting apparatus according to claim 1, wherein the sample sentence comparison unit is operable to derive a sentence correspondence degree for the obtained sample sentence based on a keyword correspondence degree of each keyword included in the obtained sample sentence.

9. The dialogue supporting apparatus according to claim 8, wherein the sample sentence comparison unit is operable to derive as the sentence correspondence degree, a number of the keywords in the obtained sample sentence, having a keyword correspondence degree that is not lower than a predetermined value.

10. The dialogue supporting apparatus according to claim 9, wherein the sample sentence display control unit is operable to determine, when displaying a plurality of sample sentences, a display order of the sample sentences based on the sentence correspondence degree.

11. The dialogue supporting apparatus according to claim 10, wherein the sample sentence display control unit is operable to display the sample sentences in declining order of sentence correspondence degree, when displaying the sample sentences.

12. The dialogue supporting apparatus according to claim 9, wherein the sample sentence display control unit is operable to highlight an entire sentence of a sample sentence having a sentence correspondence degree that is not lower than a predetermined value, when displaying a plurality of sample sentences.

13. The dialogue supporting apparatus according to claim 12, wherein the sample sentence comparison unit is operable to derive, based on the sentence correspondence degree, a display parameter for highlighting an entire sentence of the sample sentence, and wherein the sample sentence display control unit is operable to highlight the entire sentence of the sample sentence based on the display parameter.

14. A sample sentence searching apparatus for obtaining a sample sentence in a source language that corresponds to a sentence input in the source language and that includes a keyword the sample sentence searching apparatus comprising:
a sample sentence search unit operable to search for and obtain the sample sentence in the source language based on the keyword included in the sentence input in the source language;
a sample sentence comparison unit operable to derive a keyword correspondence degree by comparing (i) a location of the keyword within the obtained sample sentence that is in the source language, and (ii) a location of the keyword within the sentence input in the source language, the keyword correspondence degree indicating a degree of correspondence between the location of the keyword within the obtained sample sentence and the location of the keyword within the sentence input in the source language; and
a sample sentence display control unit operable to display the obtained sample sentence in the source language, and to highlight the keyword within the displayed sample sentence based on the derived keyword correspondence degree.

15. A dialogue support method for recognizing a speech input in a source language and for presenting a translation of the input speech in a target language, the dialogue support method comprising:
receiving the speech input in the source language and obtaining a speech recognition result of the speech input, the speech recognition result being in the source language;
searching for and obtaining a sample sentence in the source language based on a keyword included in the obtained speech recognition result;
deriving a keyword correspondence degree by comparing (i) a location of the keyword within the obtained sample sentence that is in the source language, and (ii) a location of the keyword within the speech recognition result that is in the source language, the keyword correspondence degree indicating a degree of correspondence between the location of the keyword within the obtained sample sentence and the location of the keyword within the speech recognition result; and
displaying the obtained sample sentence in the source language, and highlighting the keyword within the displayed sample sentence based on the derived keyword correspondence degree.

16. A computer-readable recording medium having a program recorded thereon, the program for recognizing a speech input in a source language and for, presenting a translation of the input speech in a target language, the program causing a computer to execute a method comprising:
receiving the speech input in the source language and obtaining a speech recognition result of the speech input, the speech recognition result being in the source language;
searching for and obtaining a sample sentence in the source language based on a keyword included in the obtained speech recognition result;
deriving a keyword correspondence degree comparing (i) a location of the keyword within the obtained sample sentence that is in the source language, and (ii) a location of the keyword within the speech recognition result that is in the source language, the keyword correspondence degree indicating a degree of correspondence between the location of the keyword within the obtained sample sentence and the location of the keyword within the speech recognition result; and
displaying the obtained sample sentence in the source language, and highlighting the keyword within the displayed sample sentence based on the derived keyword correspondence degree.

\* \* \* \* \*

UNITED STATES PATENT AND TRADEMARK OFFICE
CERTIFICATE OF CORRECTION

PATENT NO.        : 7,650,283 B2                                              Page 1 of 1
APPLICATION NO.   : 11/166239
DATED             : January 19, 2010
INVENTOR(S)       : Kenji Mizutani et al.

It is certified that error appears in the above-identified patent and that said Letters Patent is hereby corrected as shown below:

In the Claims

Column 16, Claim 4, line 54, "change the number" should read -- change a number --.

Column 17, Claim 14, line 60, "keyword the" should read -- keyword, the --.

Column 18, Claim 16, line 42, "for, presenting" should read -- for presenting --.

Signed and Sealed this

Sixth Day of July, 2010

David J. Kappos
*Director of the United States Patent and Trademark Office*